(12) United States Patent
Tamlin

(10) Patent No.: US 9,950,870 B2
(45) Date of Patent: Apr. 24, 2018

(54) VERTICAL SPIRAL CONVEYOR

(71) Applicant: Mayfran International, Inc., Cleveland, OH (US)

(72) Inventor: Paul Robert Tamlin, Lindsay (CA)

(73) Assignee: Mayfran International, Mayfield Village, OH (US)

( * ) Notice: Subject to any disclaimer, the term of this patent is extended or adjusted under 35 U.S.C. 154(b) by 0 days.

(21) Appl. No.: 14/373,106

(22) PCT Filed: Jan. 18, 2013

(86) PCT No.: PCT/US2013/022118
§ 371 (c)(1),
(2) Date: Jul. 18, 2014

(87) PCT Pub. No.: WO2013/109868
PCT Pub. Date: Jul. 25, 2013

(65) Prior Publication Data
US 2016/0167886 A1 Jun. 16, 2016

Related U.S. Application Data

(60) Provisional application No. 61/588,853, filed on Jan. 20, 2012.

(51) Int. Cl.
*B65G 47/00* (2006.01)
*B65G 27/32* (2006.01)
(Continued)

(52) U.S. Cl.
CPC ............. *B65G 27/32* (2013.01); *B65G 27/02* (2013.01); *B65G 27/12* (2013.01)

(58) Field of Classification Search
CPC .................................. B65G 27/02; B65G 27/32
(Continued)

(56) References Cited

U.S. PATENT DOCUMENTS 2,630,210 A 3/1953 Carrier et al.
2,658,286 A 11/1953 Spurlin
(Continued)

FOREIGN PATENT DOCUMENTS

GB 2204561 A 11/1988
JP 61119506 A 6/1986

OTHER PUBLICATIONS

International Search Report dated Apr. 19, 2013, for International Application Serial No. PCT/US13/022118.
(Continued)

*Primary Examiner* — William R Harp
(74) *Attorney, Agent, or Firm* — Calfee, Halter & Griswold LLP

(57) ABSTRACT

The present application discloses vertical spiral conveyors for transporting loose material without the use of vibration or oscillation and methods of transporting materials without the use of vibration or oscillation. In certain embodiments, the vertical spiral conveyor (600) comprises a vertical spiral fabrication (690) having a spiral conveyor tray (680) connected to a vertical member (612) that is configured to rotate about an axis of rotation (670), a drive arm (660) extending from the vertical spiral fabrication (690), and a drive system for rotating the vertical spiral fabrication (690) about the axis of rotation (670). The drive system comprises a power source (610) and a transmission (620) coupled to the drive arm (660). The drive system generates alternating forward and backward strokes on the drive arm (660) that rotate the vertical spiral fabrication (690) clockwise and counterclockwise about the axis of rotation to cause loose material to be conveyed around the spiral conveyor tray (680).

21 Claims, 22 Drawing Sheets

(51) Int. Cl.
*B65G 27/02* (2006.01)
*B65G 27/12* (2006.01)

(58) Field of Classification Search
USPC .................................................. 198/756, 757
See application file for complete search history.

(56) References Cited

U.S. PATENT DOCUMENTS

| | | | |
|---|---|---|---|
| 2,688,807 A * | 9/1954 | Ginther | F26B 17/266 |
| | | | 198/756 |
| 2,690,835 A | 10/1954 | Carrier et al. | |
| 2,746,468 A | 5/1956 | Desmond et al. | |
| 2,760,503 A | 8/1956 | Carrier | |
| 2,760,504 A | 8/1956 | Spurlin | |
| 2,771,983 A | 11/1956 | Carri | |
| 2,805,841 A | 9/1957 | Kyle | |
| 2,818,968 A * | 1/1958 | Carrier, Jr. | B65G 27/00 |
| | | | 198/756 |
| 2,827,062 A | 3/1958 | Nitsche | |
| 2,827,157 A | 3/1958 | Tsuchiya et al. | |
| 2,847,767 A | 8/1958 | Carrier | |
| 2,875,889 A | 3/1959 | Sherwen | |
| 2,877,890 A | 3/1959 | Carrier | |
| 2,918,070 A | 12/1959 | Carrier | |
| 2,922,514 A | 1/1960 | Carrier | |
| 2,927,683 A | 3/1960 | Carrier | |
| 2,934,202 A | 4/1960 | Roder et al. | |
| 2,940,587 A | 6/1960 | McBean | |
| 2,946,429 A | 7/1960 | Carrier | |
| 2,985,281 A | 5/1961 | Carrier | |
| 3,053,379 A | 9/1962 | Roder et al. | |
| 3,053,380 A | 9/1962 | Spurlin | |
| 3,135,429 A | 6/1964 | Anderson | |
| 3,207,293 A | 9/1965 | White | |
| 3,246,737 A | 4/1966 | Allen | |
| 3,253,700 A | 5/1966 | Allen et al. | |
| 3,258,852 A | 7/1966 | White | |
| 3,292,775 A | 12/1966 | White | |
| 3,613,870 A | 10/1971 | Burgess | |
| 3,667,591 A * | 6/1972 | Sykes | B65G 11/063 |
| | | | 198/756 |
| 3,777,770 A | 12/1973 | Cunningham-Smith | |
| 3,789,977 A | 2/1974 | Musschoot | |
| 4,022,638 A | 5/1977 | Weet | |
| 4,245,737 A | 1/1981 | Pellerin et al. | |
| 4,262,797 A * | 4/1981 | Schuricht | B65G 1/045 |
| | | | 198/756 |
| 4,267,919 A | 5/1981 | Schrader | |
| 4,362,455 A | 12/1982 | Hirose | |
| 4,775,284 A | 10/1988 | Musschoot | |
| 4,858,749 A | 8/1989 | Musschoot | |
| 5,024,320 A | 6/1991 | Musschoot | |
| 5,067,431 A | 11/1991 | Heitmiller | |
| 5,351,807 A * | 10/1994 | Svejkovsky | B65G 27/32 |
| | | | 198/750.8 |
| 5,699,897 A | 12/1997 | Svejkovsky | |
| 5,816,386 A | 10/1998 | Carlyle | |
| 5,931,286 A | 8/1999 | Illi | |
| 6,230,875 B1 | 5/2001 | Carlyle | |
| 6,415,912 B1 * | 7/2002 | Tamlin | B65G 27/12 |
| | | | 198/750.8 |
| 6,601,695 B1 | 8/2003 | Rosenstrom | |
| 6,634,488 B2 * | 10/2003 | Tamlin | B65G 27/12 |
| | | | 198/750.8 |
| 6,827,201 B1 | 12/2004 | Markowski et al. | |
| 6,851,548 B1 | 2/2005 | Dumbaugh | |
| 6,948,611 B2 | 2/2005 | Dumbaugh | |
| 6,932,210 B2 | 8/2005 | Kramer | |
| 7,037,048 B2 | 5/2006 | Markowski et al. | |
| 7,296,951 B2 | 11/2007 | Kraus et al. | |
| 7,377,728 B2 | 5/2008 | Markowski et al. | |
| 7,487,868 B2 | 2/2009 | Kraus et al. | |
| 7,540,694 B2 | 6/2009 | Markowski et al. | |
| 2004/0251113 A1 * | 12/2004 | Tamlin | B65G 27/08 |
| | | | 198/750.1 |

OTHER PUBLICATIONS

Written Opinion dated Apr. 19, 2013, for International Application Serial No. PCT/US13/022118.

International Preliminary Report on Patentability dated Jul. 22, 2014, for International Application Serial No. PCT/US13/022118.

* cited by examiner

| Drive Arm Position | Motor Hertz 25:1 Reducer | Strokes/Minute | Tray Pitch Rise/360 deg | Speed (Feet Per Minute) | | | Average Speed (Feet Per Minute) |
|---|---|---|---|---|---|---|---|
| | | | | @18" Radius | @24" Radius | @30" Radius | |
| Pos. 1 | 40 | 46 | 8 | 7 | 12 | 18 | 12 |
| Pos. 1 | 50 | 58 | 8 | 17 | 25 | 34 | 25 |
| Pos. 1 | 60 | 70 | 8 | 28 | 42 | 59 | 43 |
| Pos. 1 | 70 | 81 | 8 | 35 | 54 | 78 | 56 |
| Pos. 2 | 40 | 46 | 8 | 0 | 0 | 0 | 0 |
| Pos. 2 | 50 | 58 | 8 | 3 | 7 | 10 | 7 |
| Pos. 2 | 60 | 70 | 8 | 9 | 14 | 20 | 14 |
| Pos. 2 | 70 | 81 | 8 | 14 | 20 | 29 | 21 |
| Pos. 3 | 40 | 46 | 8 | 0 | 0 | 0 | 0 |
| Pos. 3 | 50 | 58 | 8 | 2 | 3 | 3 | 2 |
| Pos. 3 | 60 | 70 | 8 | 5 | 8 | 12 | 8 |
| Pos. 3 | 70 | 81 | 8 | 9 | 13 | 19 | 14 |

FIG. 8A

| Drive Arm Position | Motor Hertz 25:1 Reducer | Strokes/Minute | Tray Pitch Rise/360 deg | Speed (Feet Per Minute) | | | Average Speed (Feet Per Minute) |
|---|---|---|---|---|---|---|---|
| | | | | @18" Radius | @24" Radius | @30" Radius | |
| Pos. 1 | 40 | 46 | 8 | 10 | 17 | 29 | 19 |
| Pos. 1 | 50 | 58 | 8 | 14 | 22 | 36 | 24 |
| Pos. 1 | 60 | 70 | 8 | 12 | 19 | 29 | 20 |
| Pos. 1 | 70 | 81 | 8 | 0 | 0 | 0 | 0 |
| Pos. 2 | 40 | 46 | 8 | 3 | 6 | 8 | 5 |
| Pos. 2 | 50 | 58 | 8 | 5 | 11 | 18 | 11 |
| Pos. 2 | 60 | 70 | 8 | 9 | 17 | 25 | 17 |
| Pos. 2 | 70 | 81 | 8 | 8 | 13 | 28 | 16 |
| Pos. 3 | 40 | 46 | 8 | 0 | 0 | 3 | 1 |
| Pos. 3 | 50 | 58 | 8 | 0 | 7 | 12 | 6 |
| Pos. 3 | 60 | 70 | 8 | 5 | 10 | 18 | 11 |
| Pos. 3 | 70 | 81 | 8 | 8 | 16 | 25 | 16 |

FIG. 9A

| Drive Arm Position | Motor Hertz 25:1 Reducer | Strokes/Minute | Tray Pitch Rise/360 deg | Speed (Feet Per Minute) | | | Average Speed (Feet Per Minute) |
|---|---|---|---|---|---|---|---|
| | | | | @18" Radius | @24" Radius | @30" Radius | |
| Pos. 1 | 40 | 46 | 8 | 10 | 13 | 17 | 13 |
| Pos. 1 | 50 | 58 | 8 | 22 | 29 | 36 | 29 |
| Pos. 1 | 60 | 70 | 8 | 24 | 31 | 39 | 31 |
| Pos. 1 | 70 | 81 | 8 | 13 | 18 | 22 | 18 |
| Pos. 2 | 40 | 46 | 8 | 0 | 0 | 0 | 0 |
| Pos. 2 | 50 | 58 | 8 | 9 | 11 | 14 | 11 |
| Pos. 2 | 60 | 70 | 8 | 12 | 16 | 20 | 16 |
| Pos. 2 | 70 | 81 | 8 | 19 | 25 | 31 | 25 |
| Pos. 3 | 40 | 46 | 8 | 0 | 0 | 0 | 0 |
| Pos. 3 | 50 | 58 | 8 | 5 | 6 | 8 | 6 |
| Pos. 3 | 60 | 70 | 8 | 7 | 10 | 12 | 10 |
| Pos. 3 | 70 | 81 | 8 | 13 | 18 | 22 | 18 |

FIG. 10A

| Drive Arm Position | Motor Hertz 25:1 Reducer | Strokes/Minute | Tray Pitch Rise/360 deg | Speed (Feet Per Minute) | | | Average Speed (Feet Per Minute) |
|---|---|---|---|---|---|---|---|
| | | | | @18" Radius | @24" Radius | @30" Radius | |
| Pos. 1 | 40 | 46 | 8 | 9 | 17 | 26 | 17 |
| Pos. 1 | 50 | 58 | 8 | 18 | 29 | 47 | 31 |
| Pos. 1 | 60 | 70 | 8 | 24 | 38 | 59 | 40 |
| Pos. 1 | 70 | 81 | 8 | 24 | 38 | 59 | 40 |
| Pos. 2 | 40 | 46 | 8 | 0 | 5 | 7 | 4 |
| Pos. 2 | 50 | 58 | 8 | 7 | 14 | 22 | 15 |
| Pos. 2 | 60 | 70 | 8 | 9 | 17 | 29 | 19 |
| Pos. 2 | 70 | 81 | 8 | 13 | 21 | 31 | 22 |
| Pos. 3 | 40 | 46 | 8 | 0 | 0 | 0 | 0 |
| Pos. 3 | 50 | 58 | 8 | 3 | 5 | 8 | 5 |
| Pos. 3 | 60 | 70 | 8 | 6 | 9 | 15 | 10 |
| Pos. 3 | 70 | 81 | 8 | 8 | 16 | 25 | 16 |

FIG. 11A

| Drive Arm Position | Motor Hertz 25:1 Reducer | Strokes/Minute | Tray Pitch Rise/360 deg | Speed (Feet Per Minute) | | | Average Speed (Feet Per Minute) |
|---|---|---|---|---|---|---|---|
| | | | | @18" Radius | @24" Radius | @30" Radius | |
| Pos. 1 | 40 | 46 | 8 | 8 | 12 | 17 | 12 |
| Pos. 1 | 50 | 58 | 8 | 14 | 22 | 29 | 22 |
| Pos. 1 | 60 | 70 | 8 | 22 | 34 | 47 | 34 |
| Pos. 1 | 70 | 81 | 8 | 31 | 47 | 67 | 49 |
| Pos. 2 | 40 | 46 | 8 | 1 | 2 | 3 | 2 |
| Pos. 2 | 50 | 58 | 8 | 4 | 8 | 10 | 7 |
| Pos. 2 | 60 | 70 | 8 | 8 | 13 | 19 | 13 |
| Pos. 2 | 70 | 81 | 8 | 13 | 21 | 29 | 21 |
| Pos. 3 | 40 | 46 | 8 | 0 | 0 | 0 | 0 |
| Pos. 3 | 50 | 58 | 8 | 2 | 3 | 4 | 3 |
| Pos. 3 | 60 | 70 | 8 | 4 | 7 | 10 | 7 |
| Pos. 3 | 70 | 81 | 8 | 8 | 13 | 18 | 13 |

FIG. 12A

VERTICAL SPIRAL CONVEYOR

CROSS REFERENCE TO RELATED APPLICATION

This application is a PCT International Patent Application which claims priority to U.S. Provisional Patent Application No. 61/588,853, filed on Jan. 20, 2012 and titled "Vertical Spiral Conveyor," which is hereby incorporated by reference in its entirety.

BACKGROUND

Known vertical spiral conveyors utilize vibration or mechanical oscillation of the vertical spiral to move the material. However, vibrating and oscillating conveyors use a lifting and throwing motion to move the material, which tends to cause breakage, increase of "fine" particles, and separation (e.g., stratification) of fragile product such as chips and cereals.

SUMMARY

The present application discloses vertical spiral conveyors for transporting loose material without the use of vibration or mechanical oscillation and methods of transporting materials without the use of vibration or oscillation.

In certain embodiments, the vertical spiral conveyor comprises a vertical spiral fabrication having a spiral conveyor tray connected to a vertical member that is configured to rotate about an axis of rotation, a drive arm extending from the vertical spiral fabrication, and a drive system for rotating the vertical spiral fabrication clockwise and counterclockwise about the axis of rotation. The drive system comprises a power source and a transmission coupled to the drive arm. The drive system generates alternating forward and backward strokes on the drive arm that rotate the vertical spiral fabrication clockwise and counterclockwise about the axis of rotation to cause loose material to be conveyed around the spiral conveyor tray.

In certain embodiments, the method comprises utilizing a vertical spiral conveyor to transport materials. The vertical spiral conveyor comprises a vertical spiral fabrication having a spiral conveyor tray connected to a vertical member that is configured to rotate about an axis of rotation, a drive arm extending from the vertical spiral fabrication, and a drive system for rotating the vertical spiral fabrication clockwise and counterclockwise about the axis of rotation. The drive system comprises a power source and a transmission coupled to the drive arm. The vertical spiral fabrication is rotated clockwise and counterclockwise about the axis of rotation to cause loose material to be conveyed around the spiral conveyor tray. The drive system generates alternating forward and backward strokes on the drive arm that rotate the vertical spiral fabrication.

BRIEF DESCRIPTION OF DRAWINGS

FIGS. 8A and 8B show test data in table and graphical form for Cheerios® cereal conveyed using the vertical spiral conveyor shown in FIGS. 6A-6C.

FIGS. 9A and 9B show test data in table and graphical form for Steel Chips conveyed using the vertical spiral conveyor shown in FIGS. 6A-6C.

FIGS. 10A and 10B show test data in table and graphical form for Steel Chip Balls conveyed using the vertical spiral conveyor shown in FIGS. 6A-6C.

FIGS. 11A and 11B show test data in table and graphical form for Laser Scrap conveyed using the vertical spiral conveyor shown in FIGS. 6A-6C.

FIGS. 12A and 12B show test data in table and graphical form for Corn Flakes® cereal conveyed using the vertical spiral conveyor shown in FIGS. 6A-6C.

DETAILED DESCRIPTION

This Detailed Description merely describes embodiments of the invention and is not intended to limit the scope of the claims in any way. Indeed, the invention as claimed is broader than and unlimited by the preferred embodiments, and the terms used in the claims have their full ordinary meaning.

The present application discloses a vertical spiral conveyor. The conveyor utilizes beltless conveyor technology to move material upward and around the spiral. A drive system rotates the vertical spiral clockwise and counterclockwise on its vertical axis (e.g., by a few degrees) to cause loose material (e.g., bulk powders, metal chips, metal fines, food products, metal sheets, etc.) to be conveyed around the spiral conveyor tray in an upward direction, thus elevating the material. In the alternative, the spiral can be driven by the drive system to move material downward and around the spiral.

Various advantages of the spiral conveyor include: no vibration; does not separate product by size like vibration conveyor; smaller footprint than a belt conveyor (i.e., takes up less floor space); no belt grooves for food to get caught, thus it is easier to clean than a belt conveyor; no vibration frequency dead zone (i.e., vibration frequency that does not allow material to move on a vibration conveyor); not dependent on weight or density of product like vibrating conveyor; less drive mechanisms than vibrating conveyor (e.g., only 1 drive mechanism is generally required, a vibration conveyor generally requires 3 or more drive mechanisms); lower power consumption than vibrating conveyors (e.g., only about 3 Hp is generally required, a vibration conveyor generally requires 30 Hp or more); and others.

Figure 1:
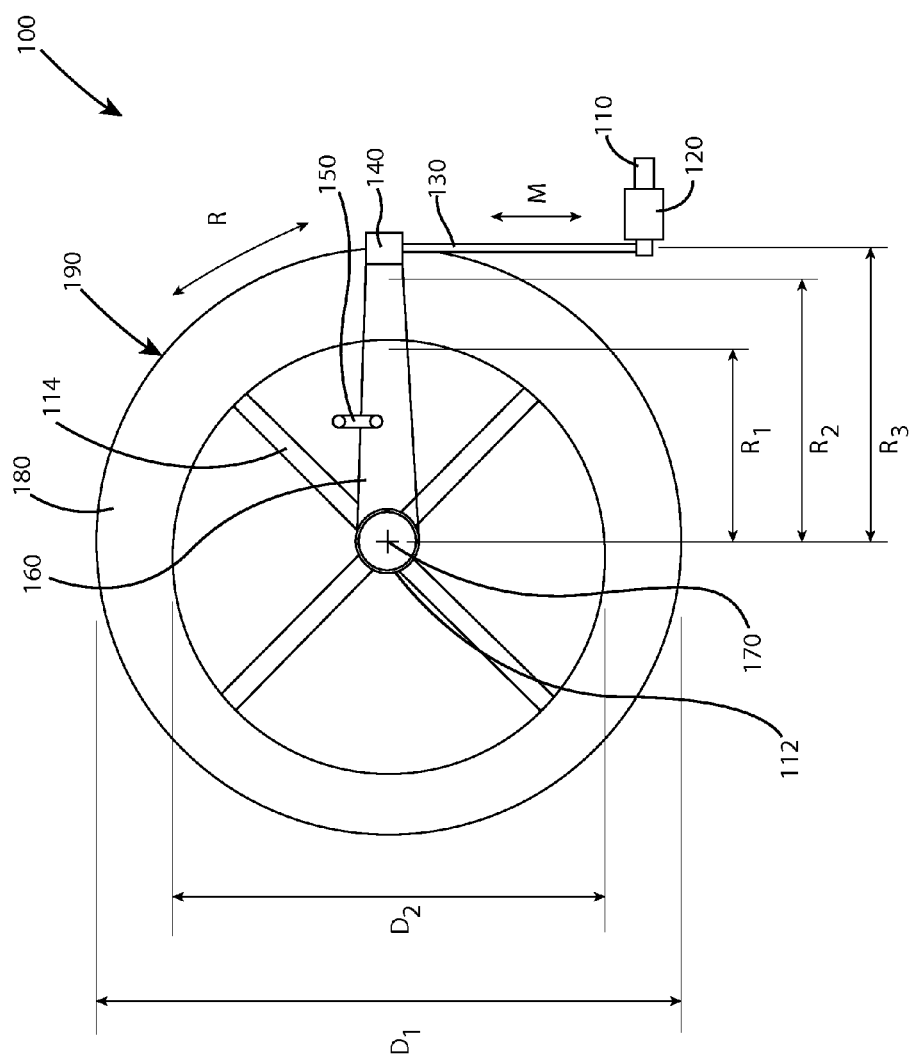
FIG. 1 is a schematic top view illustrating a vertical spiral conveyor according to an embodiment of the present application.

FIG. 1 illustrates a vertical spiral conveyor 100 according to an embodiment of the present application. The vertical spiral conveyor 100 comprises a vertical spiral fabrication ("VSF") 190 and a drive system for rotating the VSF. The VSF 190 comprises a spiral conveyor tray 180 attached via one or more support members 114 to an axial member 112 and is configured to rotate about a vertical axis or axis of rotation 170. The drive system comprises a power source, such as a motor 110, and a transmission or motion transmission box 120. The motor 110 may be a variety of motor types sized to facilitate rotation of the VSF 190, such as, for example, an electric motor, a variable speed electric motor, or the like, and may or may not include speed reducer. The output shaft of the motion transmission box 120 is coupled via a connecting rod or shaft 130 to a drive arm 160 attached to the VSF 190. As shown, the drive arm 160 is attached to the axial member 112 of the VSF 190. However, in other embodiments, the drive arm 160 may be attached to other portions of the VSF 190, such as, for example, the outside of the spiral conveyor tray 180.

As illustrated in FIG. 1, the motion transmission box 120 generates a forward stroke and a backward or return stroke in a direction M on the connecting rod 130, which is tangentially connected to the drive arm 160 of the VSF 190. The forward and backward movement of the connecting rod 130 and the drive arm 160 causes the VSF 190 to rotate clockwise and counterclockwise in a direction R about the axis of rotation 170. The motion transmission box 120 rotates the VSF 190 clockwise and counterclockwise on its vertical axis (e.g., by a few degrees) to cause loose material (e.g., bulk powders, metal fines, metal sheets, metal chips, food products, etc.) to be conveyed around the spiral conveyor tray 180 in an upward direction, thus elevating the material.

In certain embodiments, the VSF 190 rotates between about 2 degrees and about 10 degrees about the axis of rotation 170 during each forward and backward stroke. However, the amount of rotation may depend on a variety of factors, including the diameter of the VSF 190. For example, in certain embodiments, the diameter of the VSF 190 is about 120 inches and the VSF rotates about 3 degrees about the axis of rotation 170 during each forward and backward stroke. In certain embodiments, the diameter of the VSF 190 is about 96 inches and the VSF rotates about 4 degrees about the axis of rotation 170 during each forward and backward stroke. In certain embodiments, the diameter of the VSF 190 is about 40 inches and the VSF rotates about 9 degrees about the axis of rotation 170 during each forward and backward stroke.

Figure 2:
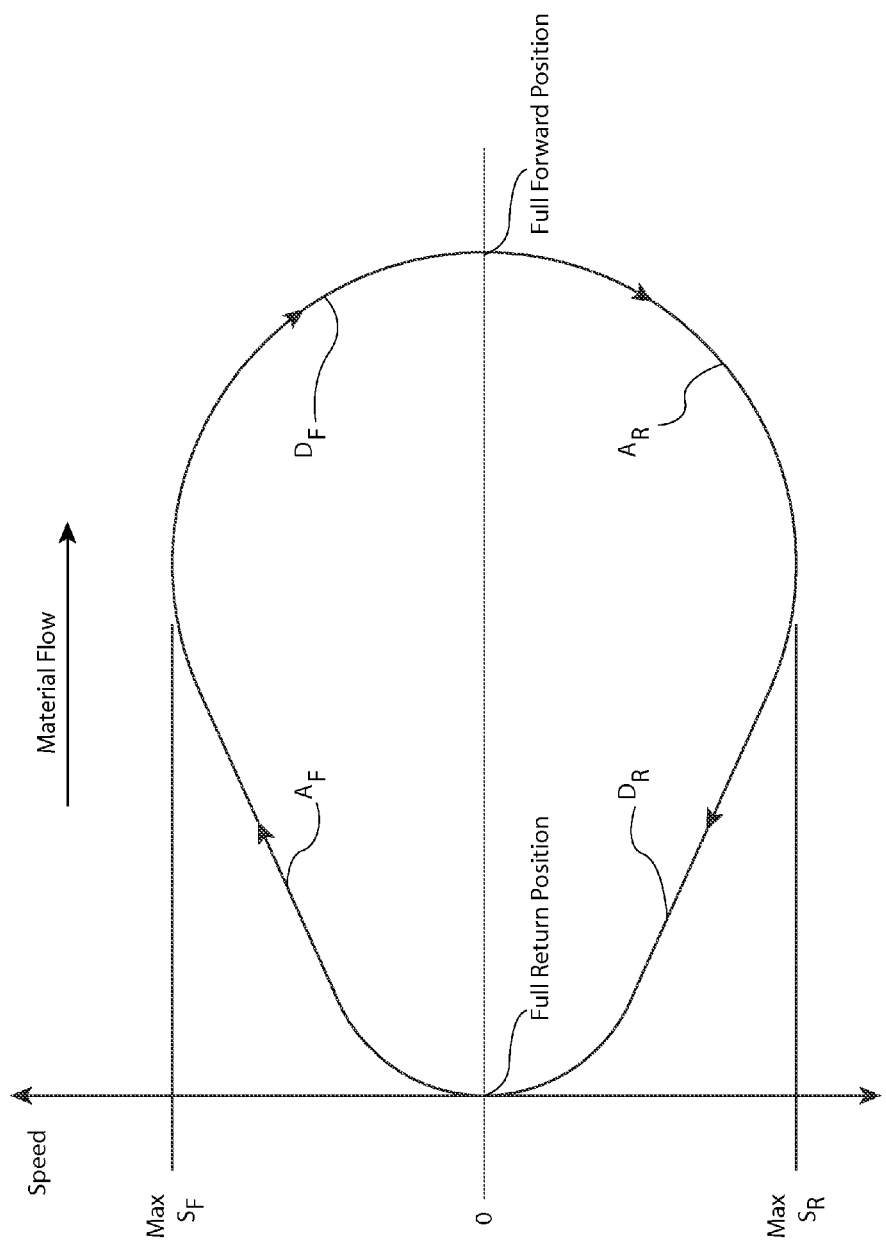
FIG. 2 illustrates the speed of rotation of a vertical spiral conveyor according to an embodiment of the present application.

FIG. 2 illustrates the speed of rotation of the VSF 190 during the forward and return stroke of the connecting rod 130 and the drive arm 160. As shown, during the forward stroke, the speed of the rotation of the VSF 190 accelerates slowly ($A_F$) to a maximum forward speed (Max $S_F$) and decelerates suddenly ($D_F$) to zero. This causes the material on the spiral conveyor tray 180 to slide forward (when viewed from the proximal side) and up around the spiral. Momentum of the material may propel the material further after motion of the connecting rod 130 and VSF 190 suddenly stop. During a first portion of the return stroke of the connecting rod 130 and the drive arm 160, the speed of the rotation of the VSF 190 accelerates quickly ($A_R$) to a maximum return speed (Max $S_R$) causing the spiral conveyor tray 180 to slide from under the material without causing much backward motion of the material as the connecting rod and VSF are repositioned in anticipation of the next forward stroke of the shaft. During a second portion of the return stroke, the speed of the rotation of the VSF 190 decelerates slowly ($D_R$) to zero without causing much backward motion of the material on the spiral conveyor tray 180. This cycle is repeated such that the product moves up and around the spiral conveyor tray 180 to the top of the system.

In certain embodiments, the maximum forward speed (Max $S_F$) and the maximum return speed (Max $S_R$) of the VSF 190 is between about 1300 feet per minute (fpm) and about 1600 fpm, between about 1400 fpm and about 1500 fpm, greater than about 1300 fpm, greater than about 1400 fpm, greater than about 1450 fpm, about 1400 fpm, about 1450 fpm, and about 1470 fpm when the motor 110 input speed is about 70 RPM. In certain embodiments, the VSF 190 may only reach the maximum speed (Max $S_R$ or Max $S_F$) during about ¼ inch or less of the forward or return stroke. During the remainder of the stroke, the VSF 190 is accelerating up to this speed or decelerating.

The connecting rod 130 may be coupled to the drive arm 160 at a variety of locations along the length of the drive arm. Furthermore, coupling the connecting rod 130 closer to the vertical axis or axis of rotation 170 of the VSF 190 increases the amount the spiral conveyor tray 180 moves or rotates during the forward and backward stroke of the connecting rod. For example, as illustrated in FIG. 1, the amount of movement of the spiral conveyor tray 180 is greater when the connecting rod 130 is coupled to the drive arm 160 at a distance $R_1$ from the axis of rotation 170 when compared to the distance $R_2$ or the distance $R_3$. In certain embodiments, the connecting rod 130 is coupled to the drive arm 160 between about 15 inches and about 30 inches from the axis of rotation 170 and the spiral conveyor tray 180 moves between about 2.5 inches and about 6 inches during each forward and backward stroke. In one embodiment, $R_1$ is about 16 inches and the corresponding amount of movement of the spiral conveyor tray 180 during the forward stroke or backward stroke of the connecting rod 130 is about 6 inches. In another embodiment, $R_2$ is about 26 inches and the corresponding amount of movement of the spiral conveyor tray 180 during the forward stroke or backward stroke of the connecting rod 130 is about 2.9 inches. In yet another embodiment, $R_3$ is about 30 inches and the corresponding amount of movement of the spiral conveyor tray 180 during the forward stroke or backward stroke of the connecting rod 130 is about 2.6 inches. As such, the spiral conveyor 100 permits the amount of movement of the spiral conveyor tray 180 during the forward stroke or backward stroke of the connecting rod 130 to be adjusted by changing the coupling point of the connecting rod and the drive arm 160.

The VSF 190 and/or the spiral conveyor tray 180 may be various sizes and the size of the spiral conveyor 100 components may depend on a variety of factors, including the type or amount of material conveyed, the required elevation change, or space constraints. For example, as illustrated in FIG. 1, the outer diameter $D_1$ of the VSF 190 or the spiral conveyor tray 180 may be between about 50 and 120 inches, less than 60 inches, about 60 inches, greater than 60 inches, less than 72 inches, about 72 inches, greater than 72 inches, about 4 feet, about 5 feet, about 6 feet, about 7 feet, about 8 feet, about 9 feet, about 10 feet, or virtually any other diameter. Further, the inner diameter $D_2$ of the spiral conveyor tray 180 may be between about 30 and 72 inches, less than 36 inches, about 36 inches, greater than 36 inches, less than 48 inches, about 48 inches, greater than 48 inches, or virtually any other diameter. Still further, the width of the spiral conveyor tray 180 may be between about 6 and 36 inches, less than 12 inches, about 12 inches, greater than 12 inches, less than 18 inches, about 18 inches, greater than 18 inches, less than 24 inches, about 24 inches, greater than 24 inches, or virtually any other width.

As illustrated in FIG. 1, the spiral conveyor 100 may include a suspension unit 140 coupling the connecting rod 130 to the drive arm 160. The suspension unit 140 may facilitate coupling of the system components and the absorption of vibration. The suspension unit 140 may also reduce the stresses on the system components, reduce wear and increase the life of the components.

Figure 7A:
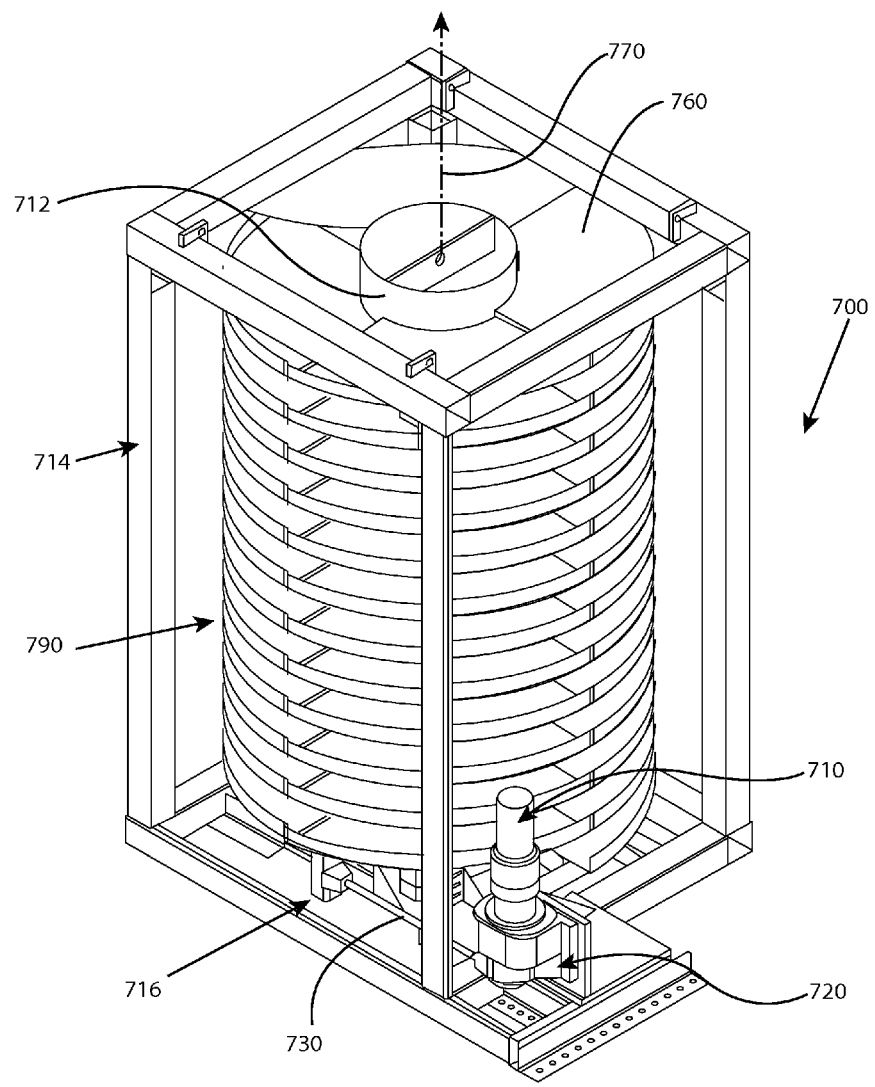
FIGS. 7A and 7B are top perspective and partial side views of another exemplary vertical spiral conveyor according to an embodiment of the present application.
Figure 7B:
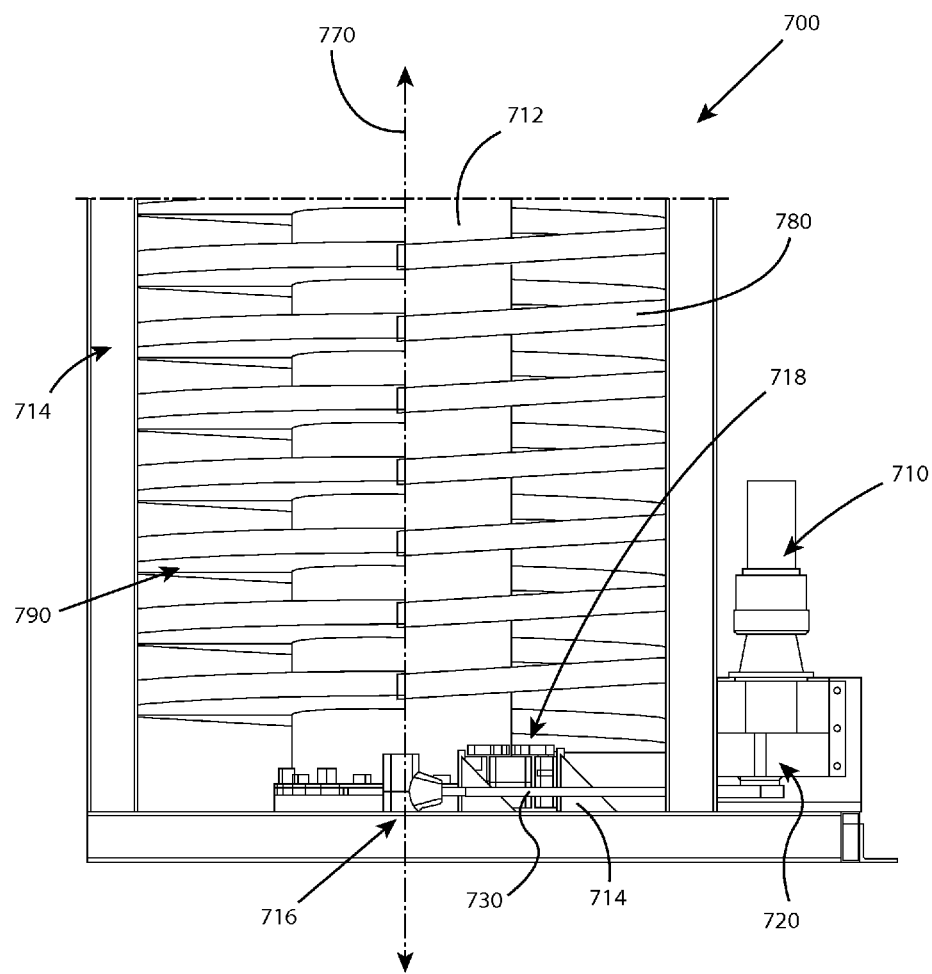

FIGS. 7A and 7B illustrate a vertical spiral conveyor 700 according to an embodiment of the present application. The vertical spiral conveyor 700 comprises a frame 714, a vertical spiral fabrication ("VSF") 790, and a drive system for rotating the VSF relative to the frame. The VSF 790 comprises a spiral conveyor tray 780 attached via one or more support members to an axial member 712 and is configured to rotate about a vertical axis or axis of rotation 770. The drive system comprises a motor 710 and a transmission or motion transmission box 720. The motor 710 may be a variety of motor types sized to facilitate rotation of the VSF 790, such as, for example, an electric motor, a variable speed electric motor, or the like, and may or may not include speed reducer. The output shaft of the motion transmission box 720 is coupled via a connecting rod or shaft 730 to a drive arm (not shown) attached to the VSF 790. The drive arm is attached to the axial member 712 of the VSF 790. However, in other embodiments, the drive arm may be attached to other portions of the VSF 790, such as, for example, the outside of the spiral conveyor tray 780. As illustrated in FIGS. 7A and 7B, the vertical spiral conveyor 700 comprises a suspension unit 716 coupling the connecting rod 730 to the drive arm. As shown, the suspension unit 716 is a ROSTA rubber suspension unit, for example a type ST 80 Drive Head.

Referring again to FIG. 1, the spiral conveyor 100 may also include one or more mechanical accumulators attached between the rotating VSF 190 or drive arm 160 and a frame of the spiral conveyor. As shown, a mechanical accumulator 150 is attached at a first end to the drive arm 160 and a second end to a frame (not shown) of the spiral conveyor 100. However, in other embodiments, more or less mechanical accumulators may be attached to the rotating VSF 190 or drive arm 160 of the spiral conveyor 100. The mechanical accumulator 150 may be configured to assist and/or resist the rotation of the VSF 190 or movement of the drive arm 160 during the forward and/or backward stroke of the connecting rod 130. As such, the mechanical accumulator 150 reduces the stresses on the system components, reduces wear and increases the life of the components. Furthermore, the mechanical accumulator 150 may be configured to complement or assist the motion of the VSF 190 or drive arm 160 such that a smaller motor 110 may be used with the system to achieve a desired or specified motion of the VSF 190, therefore reducing the energy consumption of the spiral conveyor 100.

Figure 13A:
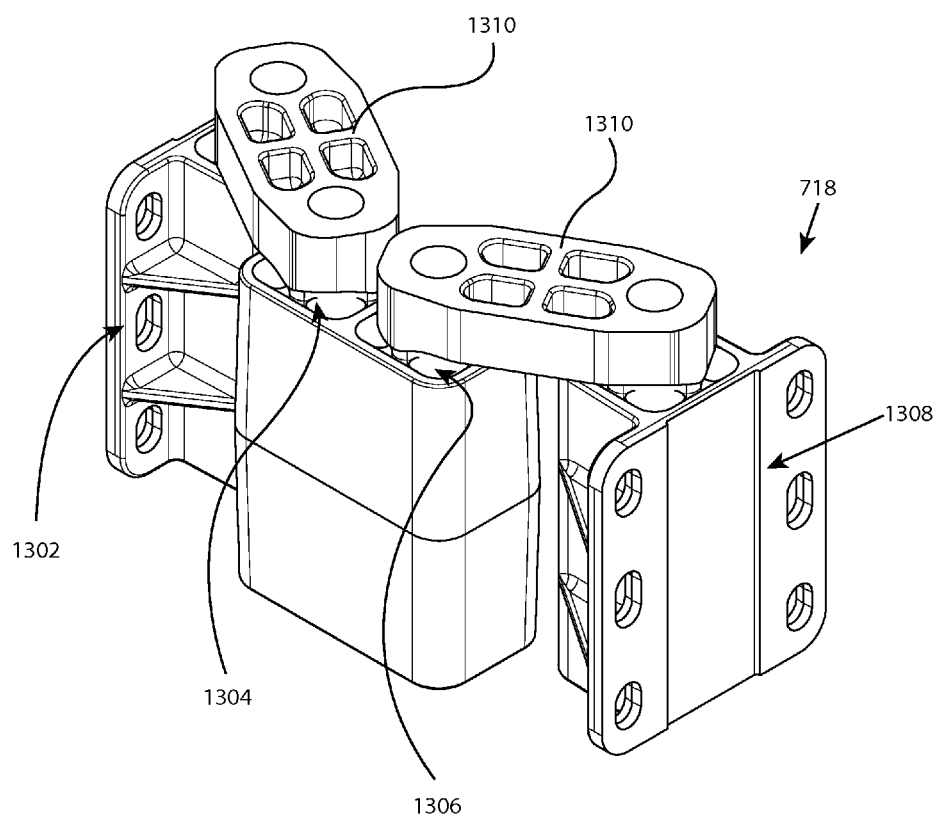
FIGS. 13A and 13B are top and bottom perspective views of an exemplary mechanical accumulator of the vertical spiral conveyor shown in FIGS. 7A and 7B.
Figure 13B:
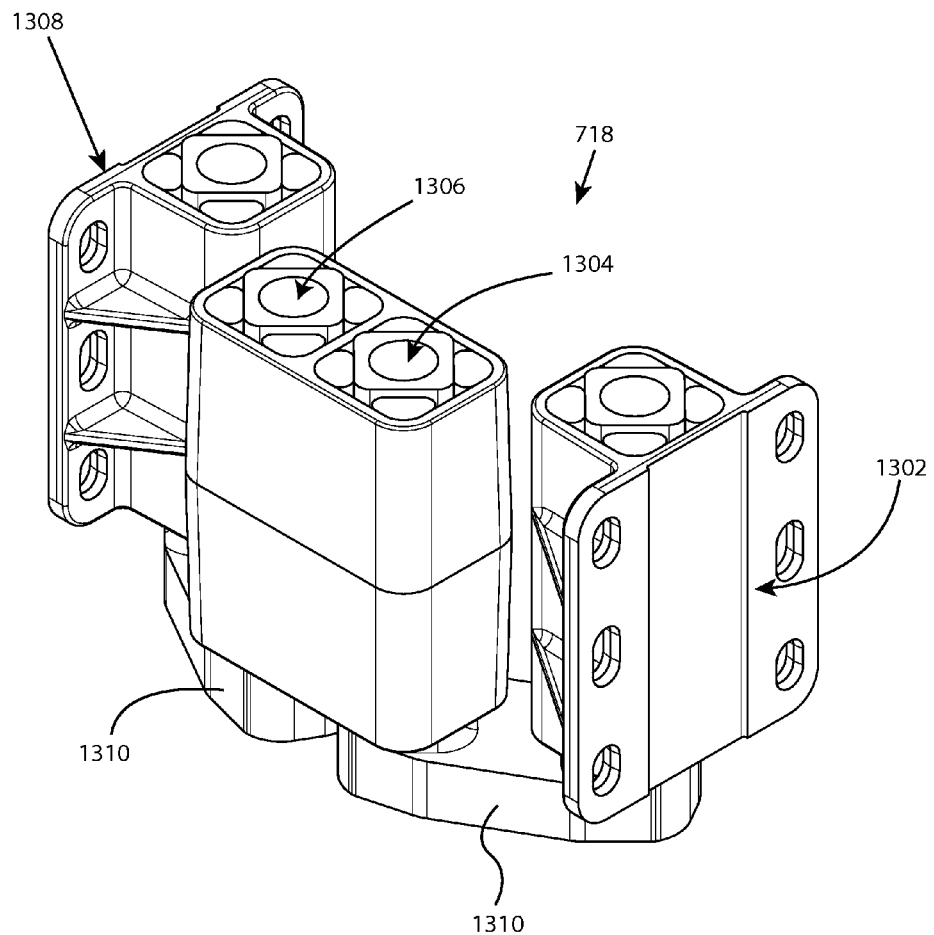

As illustrated in FIGS. 7A and 7B, the vertical spiral conveyor 700 comprises a mechanical accumulator 718 having a first end attached to a drive arm and a second end attached to a frame 714 of the vertical spiral conveyor. FIGS. 13A and 13B illustrate the mechanical accumulator 718 of the vertical spiral conveyor 700. As shown, the accumulator 718 comprises four accumulator portions, a first portion 1302 pivotally coupled to a second portion 1304 by a rocker arm 1310 and a third portion 1306 pivotally coupled to a fourth portion 1308 by a rocker arm 1310. The second portion 1304 and the third portion 1306 share a common housing and are fixed relative to one another. The first portion 1302 is coupled to the drive arm of the vertical spiral conveyor 700 and the fourth portion 1308 is coupled to the frame 714 of the vertical spiral conveyor. The accumulator 718 is configured such that the first and fourth portions 1302 and 1308 move relative to one another and pivot relative to the second and third portions 1304 and 1306 to assist and/or resist the movement of the drive arm relative to the frame 714 of the vertical spiral conveyor 700. As such, the accumulator 718 may be configured to assist and/or resist the rotation of the VSF 790 or movement of the drive arm during the forward and/or backward stroke of the connecting rod 730. As shown, the mechanical accumulator 718 is a ROSTA rubber accumulator, for example a type AB 50-2 spring accumulator. However, other mechanical accumulators capable of assisting and/or resisting the rotation of the VSF 790 or movement of the drive arm during the forward and/or backward stroke of the connecting rod 730 may be used.

Figure 3:
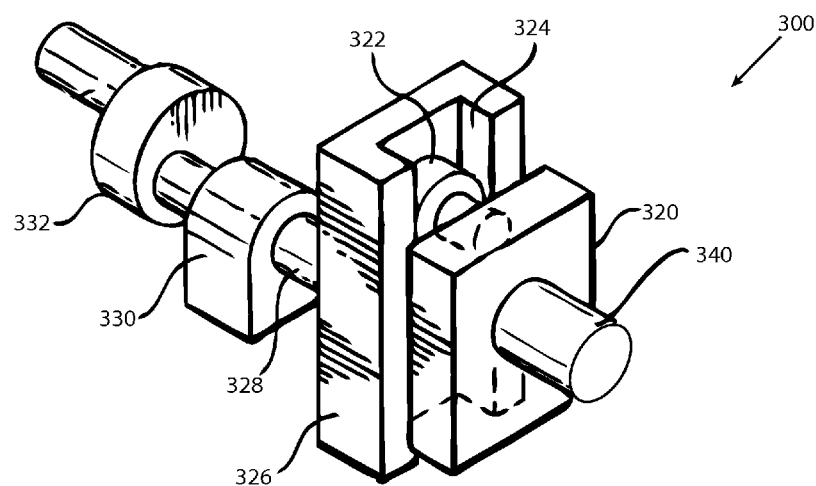
FIG. 3 is a perspective view of an exemplary transmission for a vertical spiral conveyor according to an embodiment of the present application.
Figure 4:
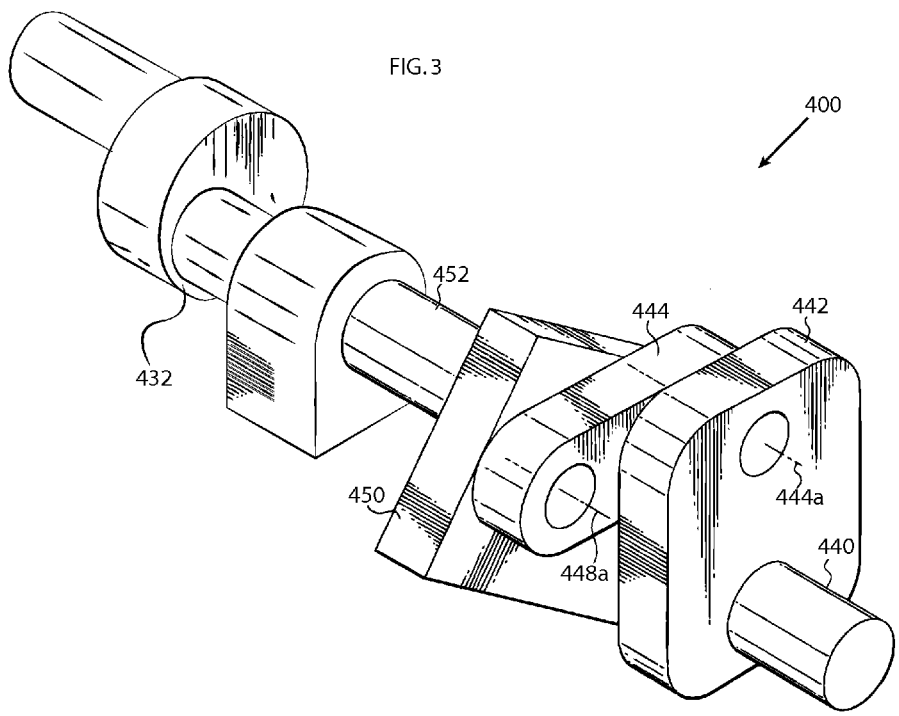
FIG. 4 is a perspective view of another exemplary transmission for a vertical spiral conveyor according to an embodiment of the present application.

In certain embodiments, the motion transmission box 120 of the spiral conveyor 100 is a differential motion transmission box or "Shuffle Drive" similar to that described in U.S. Pat. Nos. 6,415,912 and 6,634,488, both of which are incorporated herein by reference in their entirety. FIGS. 3 and 4 of the present application illustrate two embodiments of a shuffle drive, either of which may be used in the drive system of the spiral conveyors of the present application.

As illustrated in FIG. 3, the shuffle drive or driving apparatus 300 comprises a cam 322 rotated by a drive shaft 340 and a follower 326 having a slot 324 formed therein for receipt of the cam. As the cam 322 rotates, it rolls backwards and forwards in the slot 324 and imparts rotation to the follower 326. A connecting or output shaft 328 is affixed to the follower 326 and is rotated thereby. The connecting shaft 328 has an axis of rotation parallel to, but offset from, the axis of rotation of the drive shaft 340. A crank 332 is affixed to the connecting shaft 328 and is operatively connected to the spiral conveyor tray for imparting reciprocating motion to the tray.

As illustrated in FIG. 4, the shuffle drive or driving apparatus 400 comprises a drive shaft 440 affixed to a rotating driving block or member 442. A link 444 is rotatably mounted in bearings to the block to rotate about axis 444a. The link 444 is also rotatably mounted in bearings to a driven block or member 450 to rotate about an axis 448a. A connecting or output shaft 452 is affixed to the driven block 450. The axis of rotation 444a of the link 444 is offset from the axis of rotation of drive shaft 440 and the axis of rotation of the connecting shaft 452 is also offset from the axis of rotation of the drive shaft. A crank 432 is affixed to the connecting shaft 452 and is operatively connected to the spiral conveyor tray for imparting reciprocating motion to the tray.

The shuffle drives 300 and 400 are configured to impart similar reciprocating motion to the spiral conveyor tray. As such, coupling the crank 332 and 432 of the shuffle drives 300 and 400 to the VSF 190 of the spiral conveyor 100 will generate the motion of the VSF described above and shown in FIG. 2, which illustrates the speed of rotation of the VSF during the forward and backward stroke of the connecting rod 130 and the drive arm 160.

Figure 5:
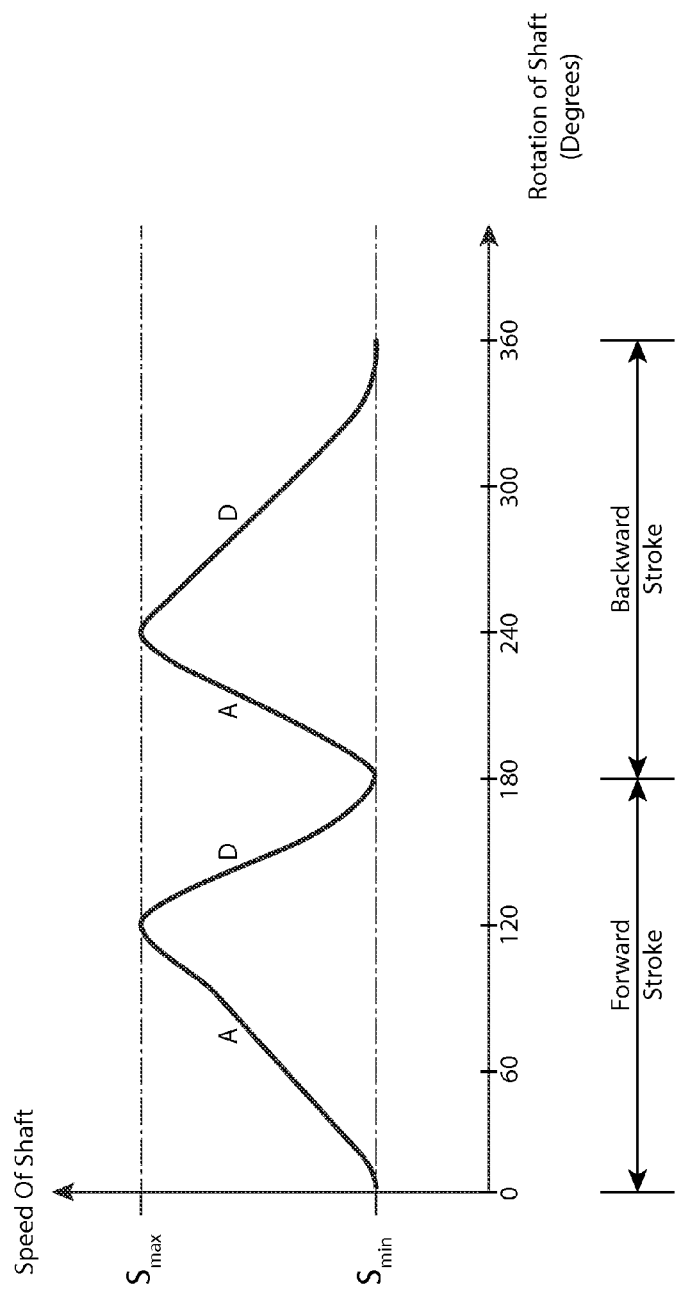
FIG. 5 illustrates the speed of rotation of an output shaft of a transmission for a vertical spiral conveyor according to an embodiment of the present application.

FIG. 5 illustrates the speed of rotation of the connecting or output shaft 328 of the shuffle drive 300 and the connecting or output shaft 452 of the shuffle drive 400 for one revolution of the shaft. As shown, the connecting shaft 328 and 452 rotates from 0-180 degrees during the forward stroke of the connecting rod 130 of the spiral conveyor 100 and from 180-360 degrees during the backward or return stroke of the connecting rod 130. The connecting shaft 328 and 452 gradually accelerates from a minimum rotation speed $S_{min}$ to a maximum rotation speed $S_{max}$ between 0 and about 120 degrees, 120 degrees+/−5 degrees or at about 123 degrees in one specific embodiment. The connecting shaft 328 and 452 then quickly decelerates from the maximum rotation speed $S_{max}$ to the minimum rotation speed $S_{min}$ between about 120 degrees and 180 degrees. The connecting shaft 328 and 452 then quickly accelerates again from the minimum rotation speed $S_{min}$ to the maximum rotation speed $S_{max}$ between 180 and about 240 degrees, 240 degrees+/−5 degrees or at about 237 degrees in one specific embodiment. The connecting shaft 328 and 452 then gradually decelerates from the maximum rotation speed $S_{max}$ to the minimum rotation speed $S_{min}$ between about 240 degrees and 360 degrees.

The values for $S_{min}$ and $S_{max}$ of the connecting shaft 328 and 452 will vary depending on the rotation speed $S_{drive}$ of the drive shaft 340 and 440 of the shuffle drive 300 and 400, which is coupled to the motor of the vertical spiral conveyor. For example, the minimum rotation speed $S_{min}$ of the connecting shaft 328 and 452 will range between about 30 RPM and about 60 RPM for rotation speeds $S_{drive}$ of the drive shaft 340 and 440 between about 45 RPM and about 85 RPM. Also, the maximum rotation speed $S_{max}$ of the connecting shaft 328 and 452 will range between about 80 RPM and about 145 RPM for rotation speeds $S_{drive}$ of the drive shaft 340 and 440 between about 45 RPM and about 85 RPM. The table below includes approximate values for $S_{min}$ and $S_{max}$ of the connecting shaft 328 and 452 for given rotation speeds $S_{drive}$ of the drive shaft 340 and 440 of the shuffle drive 300 and 400, which is coupled to the motor of the vertical spiral conveyor.

| $S_{drive}$ (Hertz) | $S_{drive}$ (RPM) +/− 3 RPM | $S_{min}$ (RPM) +/− 3 RPM | $S_{max}$ (RPM) +/− 3 RPM |
|---|---|---|---|
| 40 | 46 | 32 | 81 |
| 50 | 58 | 40 | 102 |
| 60 | 70 | 48 | 123 |
| 70 | 81 | 56 | 143 |

Rapid, sudden, or quick deceleration of the connecting shaft 328 and 452 occurs when the rotation speed of the shaft decreases from the maximum rotation speed $S_{max}$ to the minimum rotation speed $S_{min}$ in about 60 degrees of rotation of the shaft, or between about 50 degrees and about 70 degrees of rotation of the shaft. For example, in certain embodiments, the connecting shaft 328 and 452 will quickly decelerate from about 143 RPM to about 56 RPM in about 60 degrees of rotation of the shaft. Further, rapid, sudden, or quick acceleration of the connecting shaft 328 and 452 occurs when the rotation speed of the shaft increases from the minimum rotation speed $S_{min}$ to the maximum rotation speed $S_{max}$ in about 60 degrees of rotation of the shaft, or between about 50 degrees and about 70 degrees of rotation of the shaft. For example, in certain embodiments, the connecting shaft 328 and 452 will quickly accelerate from about 56 RPM to about 143 RPM in about 60 degrees of rotation of the shaft.

Gradual or slow acceleration of the connecting shaft 328 and 452 occurs when the rotation speed of the shaft increases from the minimum rotation speed $S_{min}$ to the maximum rotation speed $S_{max}$ in about 120 degrees of rotation of the shaft, or between about 110 degrees and about 130 degrees of rotation of the shaft. For example, in certain embodiments, the connecting shaft 328 and 452 will gradually accelerate from about 56 RPM to about 143 RPM in about 120 degrees of rotation of the shaft. Gradual or slow deceleration of the connecting shaft 328 and 452 occurs when the rotation speed of the shaft decreases from the maximum rotation speed $S_{max}$ to the minimum rotation speed $S_{min}$ in about 120 degrees of rotation of the shaft, or between about 110 degrees and about 130 degrees of rotation of the shaft. For example, in certain embodiments, the connecting shaft 328 and 452 will gradually decelerate from about 143 RPM to about 56 RPM in about 120 degrees of rotation of the shaft.

The connecting shaft 328 and 452 gradually accelerates from a minimum rotation speed $S_{min}$ to a maximum rotation speed $S_{max}$ between 0 and about 120 degrees, 120 degrees+/−5 degrees or at about 123 degrees in one specific embodiment. The connecting shaft 328 and 452 then quickly decelerates from the maximum rotation speed $S_{max}$ to the minimum rotation speed $S_{min}$ between about 120 degrees and 180 degrees. The connecting shaft 328 and 452 then quickly accelerates again from the minimum rotation speed $S_{min}$ to the maximum rotation speed $S_{max}$ between 180 and about 240 degrees, 240 degrees+/−5 degrees or at about 237 degrees in one specific embodiment. The connecting shaft 328 and 452 then gradually decelerates from the maximum rotation speed $S_{max}$ to the minimum rotation speed $S_{min}$ between about 240 degrees and 360 degrees.

FIGS. 6A-6D illustrate a vertical spiral conveyor 600 according to an embodiment of the present application. The vertical spiral conveyor 600 comprises a frame 692, a vertical spiral fabrication ("VSF") 690, and a drive system for rotating the VSF. The VSF 690 comprises a spiral conveyor tray 680 attached via one or more support members 614 to an axial member 612. The frame 692 is configured to support the VSF 690 and facilitate rotation of the VSF about a vertical axis or axis of rotation 670. As shown, the frame 692 supports the axial member 612 of the VSF 690 and bearings permit rotation of the axial member relative to the frame. However, in other embodiments, the VSF may be supported on one or more sides by the frame in lieu of or in addition to being supported by an axial member. Further, for the purposes of clarity, only a little more than one 360 degree portion of the spiral conveyor tray 680 is shown. However, it should be understood that the vertical spiral conveyor 600 may be any length, have various angular portions, and/or elevate material various vertical distances.

The drive system of the vertical spiral conveyor 600 comprises a motor 610 and a transmission or a motion transmission box 620. The output of the motion transmission box 620 is coupled via a connecting rod or shaft 630 to a drive arm 660 attached to the VSF 690. As shown, the drive arm 660 is attached to the axial member 612 of the VSF 690. However, in other embodiments, the drive arm 660 may be attached to other portions of the VSF 690, such as, for example, the outside of the spiral conveyor tray 680. The motor 610 of the vertical spiral conveyor 600 may be a variety of motor types sized to facilitate rotation of the VSF 690, such as, for example, an electric motor, a variable speed electric motor, or the like, and may or may not include a speed reducer. As illustrated in FIGS. 6A-8B, the motor 610 is a variable speed 1 Hp Sumitomo 6100 gearmotor with a 25:1 speed reducer. Furthermore, the motion transmission box 620 of the spiral conveyor 600 comprises a shuffle drive as described above with reference to FIGS. 3 and 4 and/or as described in U.S. Pat. Nos. 6,415,912 and 6,634,488.

The motion transmission box 620 is configured to generate a forward stroke and a backward or return stroke on the connecting rod 630, which is tangentially connected to the drive arm 660 of the VSF 690. The forward and backward movement of the connecting rod 630 and the drive arm 660 causes the VSF 690 to rotate clockwise and counterclockwise about the axis of rotation 670. The motion transmission box 620 rotates the VSF 690 clockwise and counterclockwise on its vertical axis (e.g., by a few degrees) to cause loose material (e.g., bulk powders, metal fines, metal chips, metal plates, food products, etc.) to be conveyed around the spiral conveyor tray 680 in an upward direction, thus elevating the material. Furthermore, the motion of the VSF 690 is the same as described above in reference to VSF 190 and shown in FIG. 2, which illustrates the speed of rotation of the VSF during the forward and backward stroke of the connecting rod.

Figure 6A:
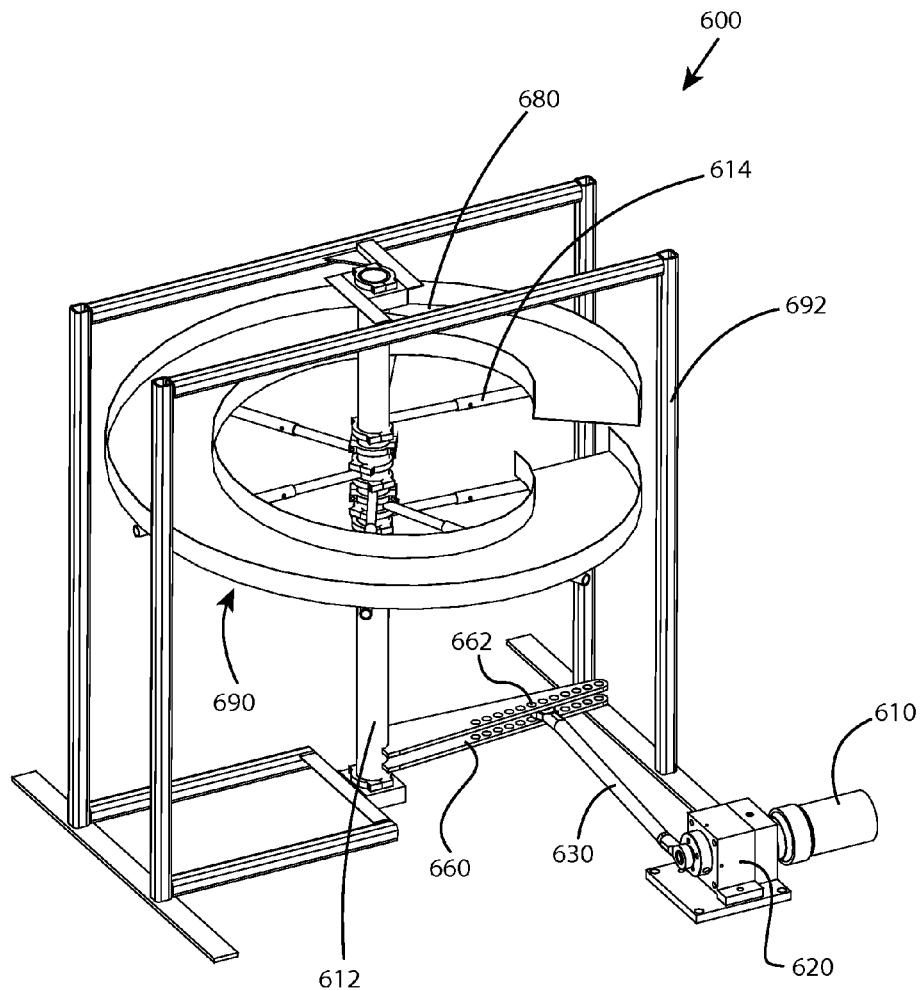
FIGS. 6A-6C are perspective, side, and top views, respectively, of an exemplary vertical spiral conveyor according to an embodiment of the present application.
Figure 6B:
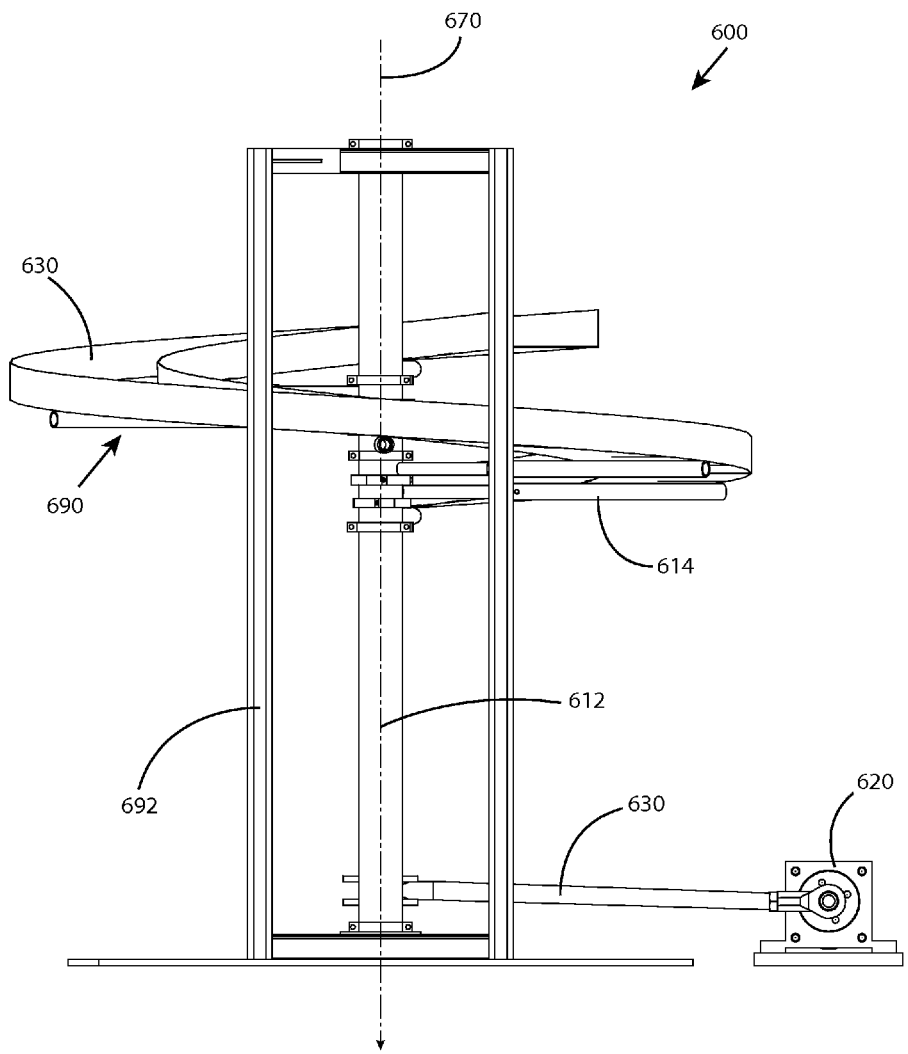
Figure 6C:
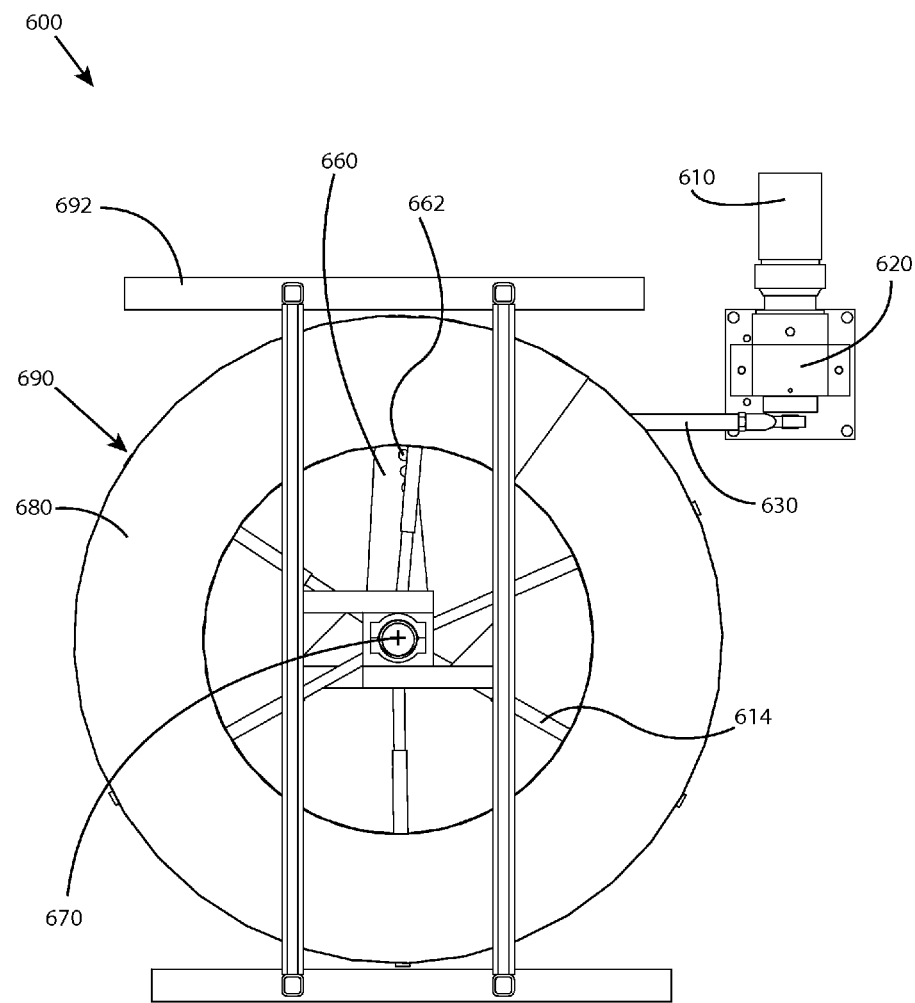
Figure 6D:
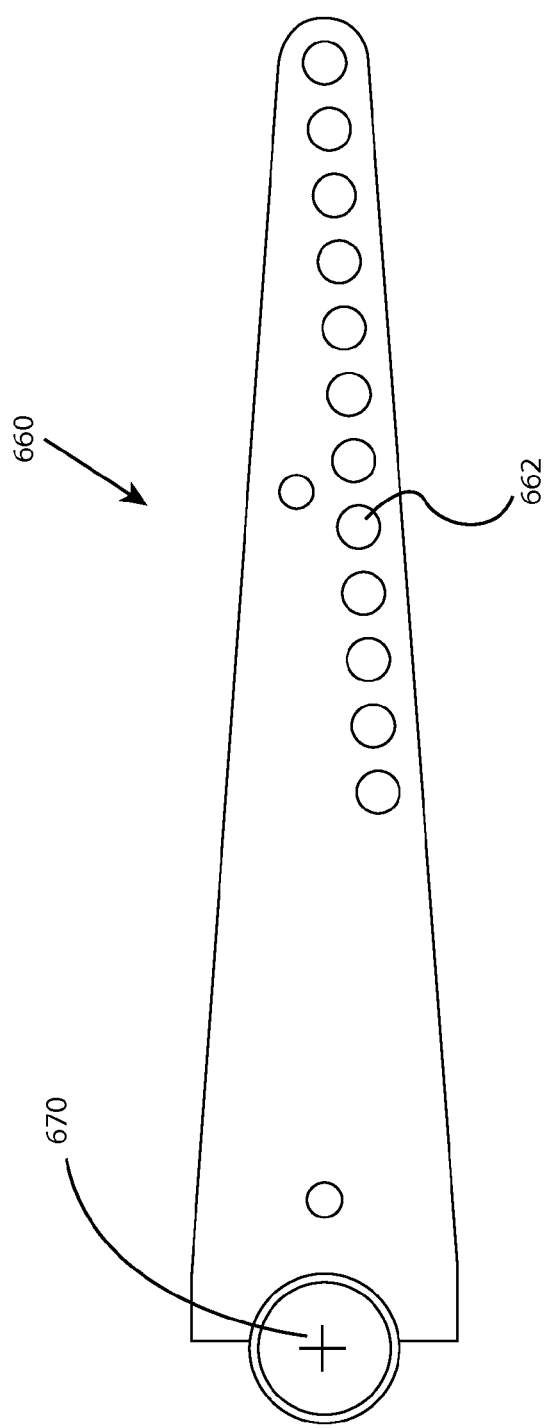
FIG. 6D is a top view of an exemplary drive arm of the vertical spiral conveyor of FIGS. 6A-6C.

The pitch of the spiral conveyor tray 680 (i.e., the rise of the conveyor tray for a 360 degree portion of the conveyor tray) may be a variety of distances, such as, for example, between about 3 and 12 inches, less than 8 inches, about 8 inches, greater than 8 inches, about 5 inches, about 6 inches, about 7 inches, about 8 inches, about 9 inches, about 10 inches, or virtually any other distance. Furthermore, the pitch of the spiral conveyor tray 680 may be adjusted. For example, adjusting the support members 614 relative to the axial member 612 changes the pitch of the spiral conveyor tray 680, such as, for example, adjusting the length and/or vertical position of one or more support members relative to the axial member. As illustrated in FIGS. 6A and 6B, the pitch of the spiral conveyor tray 680 is about 8 inches for a 360 degree portion or segment of the conveyor tray.

As illustrated in FIGS. 6A-6D, the drive arm 660 of the vertical spiral conveyor 600 comprises one or more openings or connection points 662 for the connecting rod 630. As described above in reference to vertical spiral conveyor 100, coupling the connecting rod 630 closer to the vertical axis or axis of rotation 670 of the VSF 690 increases the amount the spiral conveyor tray 680 moves or rotates during the forward and backward stroke of the connecting rod. As such, the spiral conveyor 600 permits the amount of movement of the spiral conveyor tray 680 during the forward stroke or backward stroke of the connecting rod 630 to be adjusted by coupling the connecting rod to the drive arm 660 at one of the variety of connection points 662.

Figure 8B:
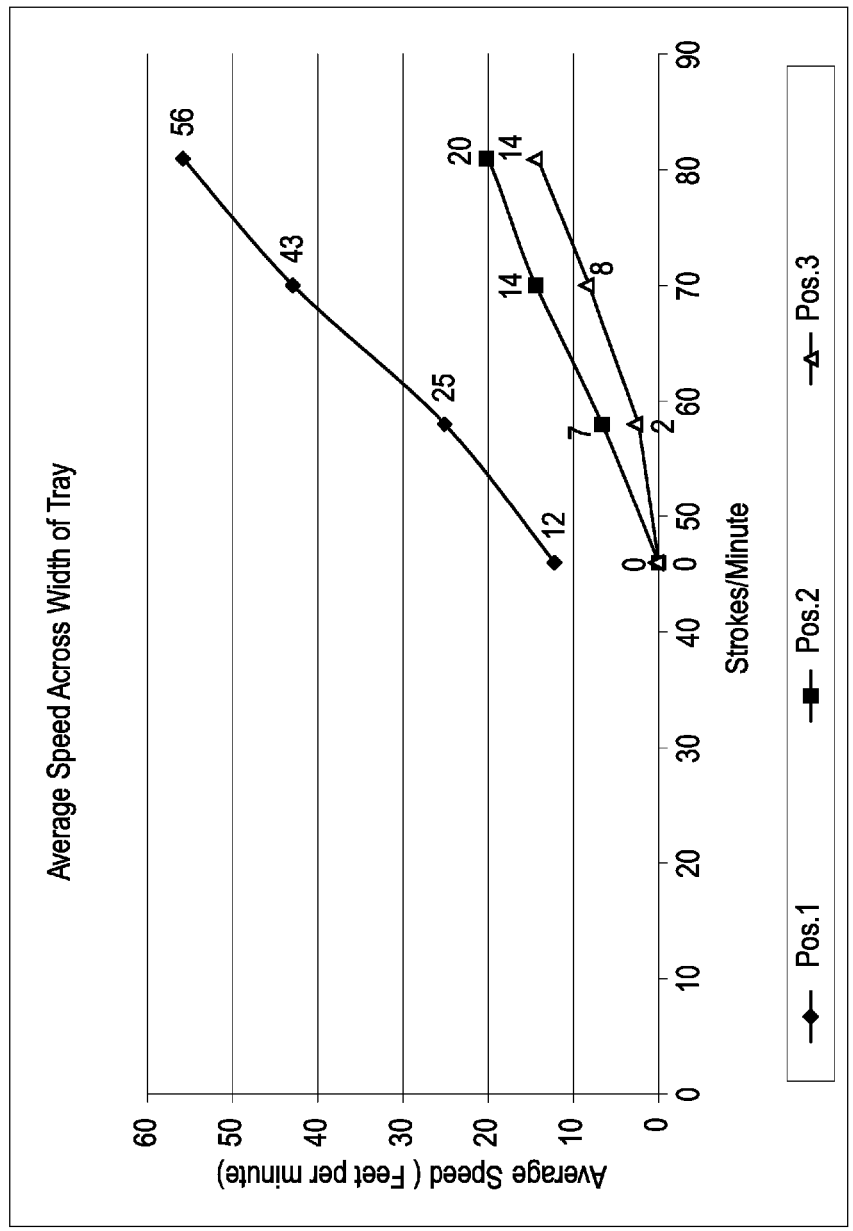
Figure 9B:
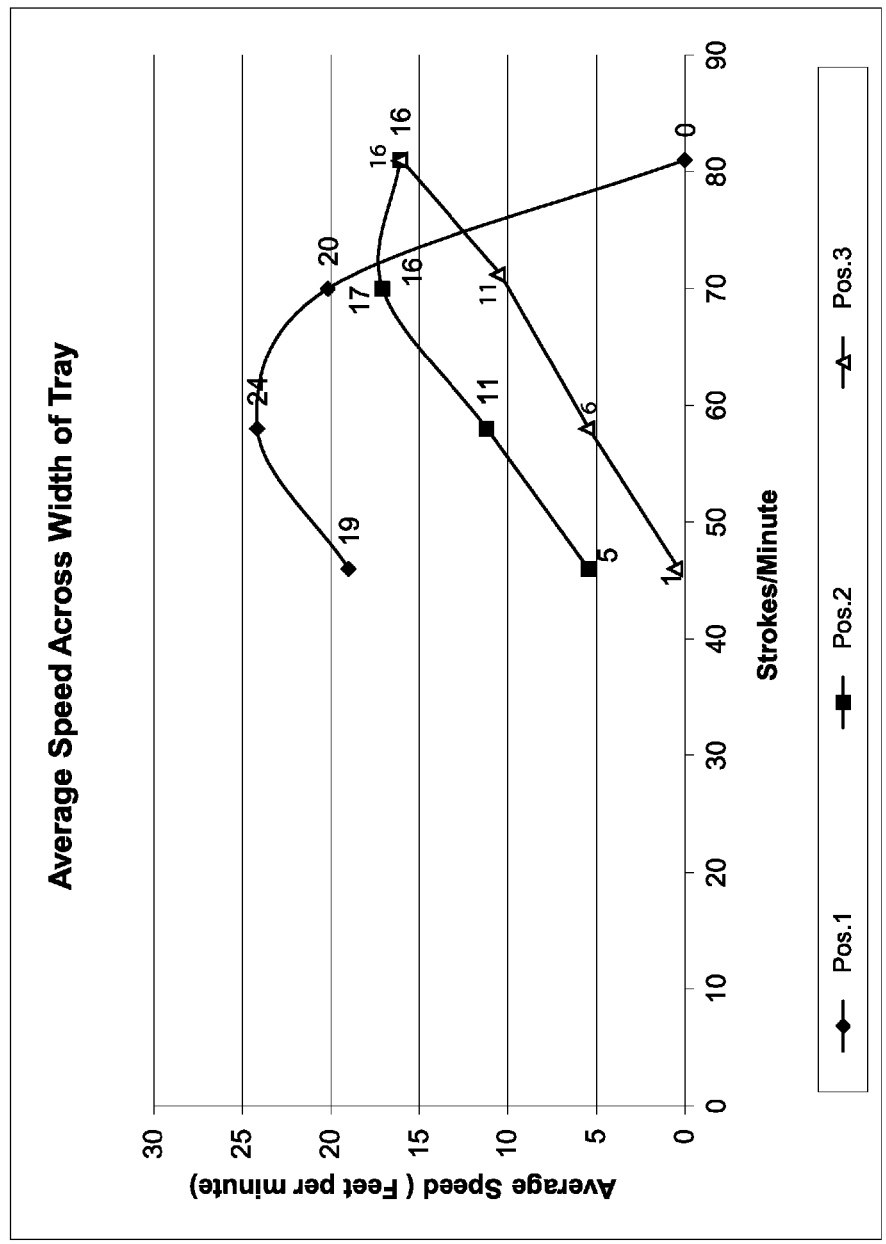
Figure 10B:
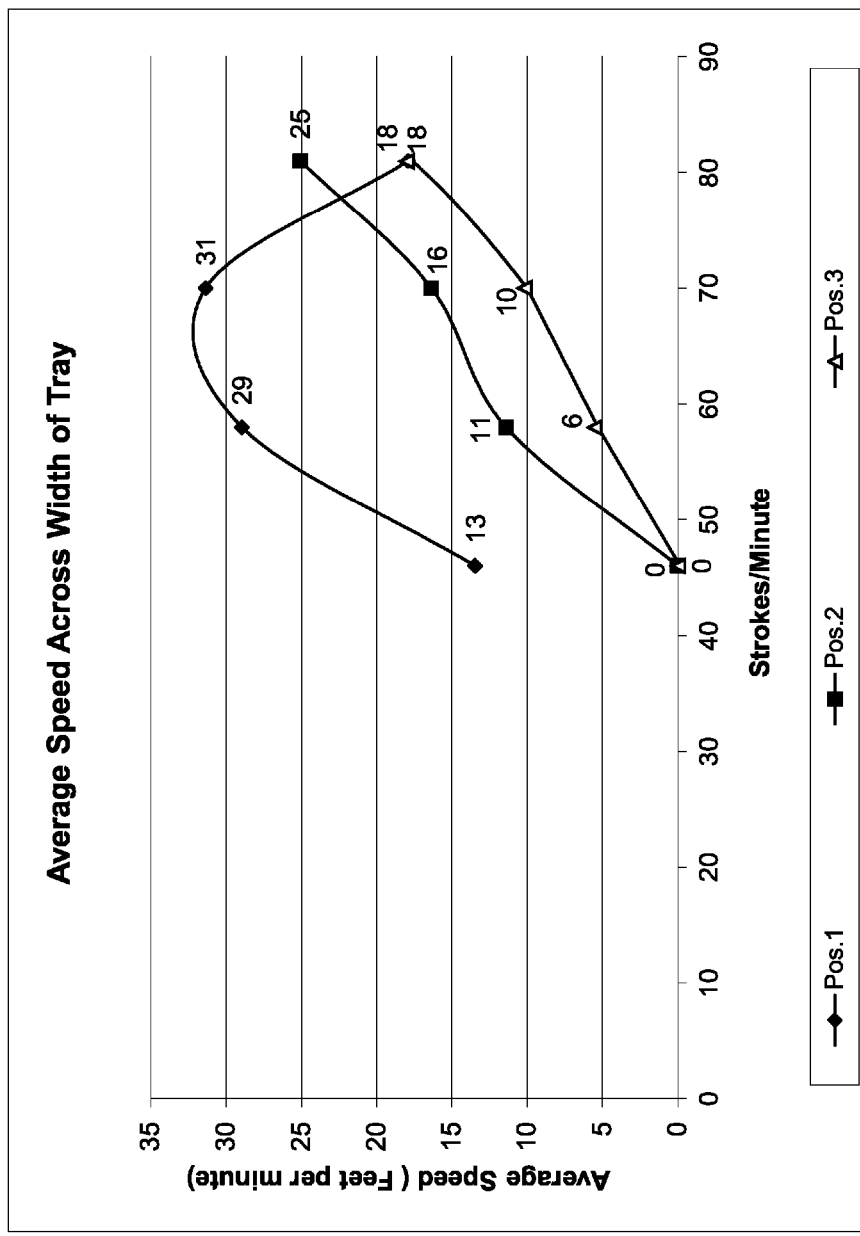
Figure 11B:
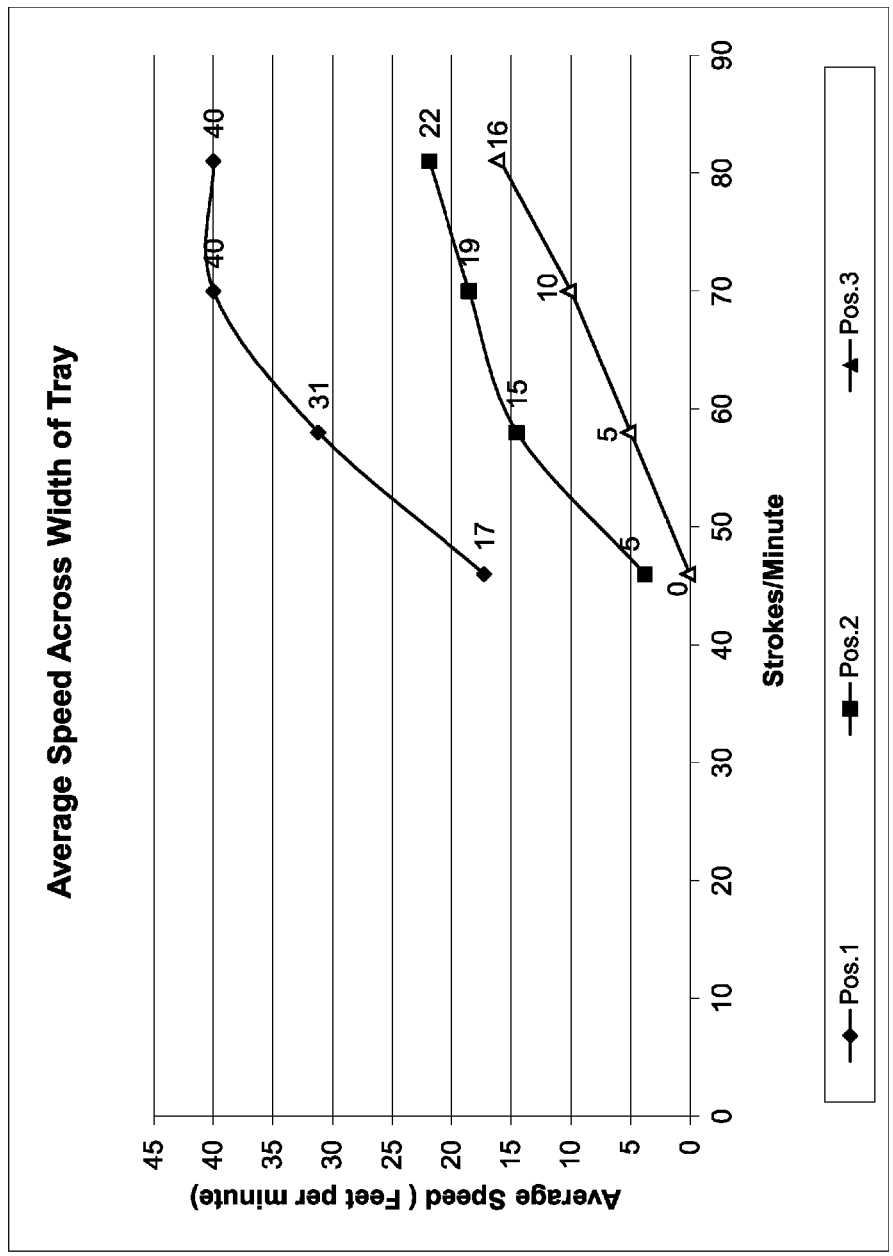

The vertical spiral conveyor 600 was tested with five different loose materials—Cheerios® cereal, Steel Chips (curled steel shavings), Steel Chip Balls (spiral steel shavings), Laser Scrap (flat metal pieces of various sizes), and Kellogg's Corn Flakes® cereal. Although no tests were run with potato chips, it is expected that tests with potato chips would result in similar values as the tests with Corn Flakes® cereal. The test results are shown in: FIGS. 8A and 8B for the Cheerios® cereal; FIGS. 9A and 9B for the Steel Chips; FIGS. 10A and 10B for the Steel Chip Balls; FIGS. 11A and 11B for the Laser Scrap; and FIGS. 12A and 12B for the Corn Flakes® cereal.

As can be seen in the test results, the same set of tests were run for each of the different materials. In a first set of tests, the connecting rod 630 was coupled to drive arm 660 of the vertical spiral conveyor 600 at a first or inner stroke position, which is referenced in the spreadsheet and graphs as "Pos. 1". In the first position, the connecting rod 630 is coupled to the drive arm 660 approximately 16 inches from the vertical axis or axis of rotation 670 of the vertical spiral conveyor 600. In this position, the spiral conveyor tray 680 moves approximately 6 inches during the forward stroke or backward stroke of the connecting rod 630. Four tests were run with the connecting rod 630 in the first position varying the motor 610 speed—40 Hz (46 Strokes/Minute), 50 Hz (58 Strokes/Minute), 60 Hz (70 Strokes/Minute), and 70 Hz (81 Strokes/Minute). For the purpose of these calculations, one stroke is one complete cycle (one forward and one return stroke of the connection rod 630 and the drive arm 660).

The same set of tests varying the motor speed were run with the connecting rod 630 in a second or middle stroke position ("Pos. 2") and a third or outer stroke position ("Pos. 3"). In the second position, the connecting rod 630 is coupled to the drive arm 660 approximately 26 inches from the vertical axis or axis of rotation 670 of the vertical spiral conveyor 600 and the spiral conveyor tray 680 moves approximately 2.9 inches during the forward stroke or backward stroke of the connecting rod. In the third position, the connecting rod 630 is coupled to the drive arm 660 approximately 30 inches from the vertical axis or axis of rotation 670 of the vertical spiral conveyor 600 and the spiral conveyor tray 680 moves approximately 2.6 inches during the forward stroke or backward stroke of the connecting rod. In all the tests, the pitch of the spiral conveyor tray 680 was about 8 inches for a 360 degree portion or segment of the conveyor tray.

During the tests, the amount of time for the material to travel 180 degrees about the spiral conveyor tray 680 was measured for each test ("Time for 180 Degrees"). This time was measured for material at: the inside edge of the 12 inch wide spiral conveyor tray 680 which is approximately 18 inches from the vertical axis or axis of rotation 670 ("@ 18" Radius" or "18"); the middle line of the spiral conveyor tray which is approximately 24 inches from the vertical axis or axis of rotation ("@ 24" Radius" or "24"); and the outside edge of the spiral conveyor tray which is approximately 30 inches from the vertical axis or axis of rotation ("@ 30" Radius" or "30"). Furthermore, the speed of the material ("Calculated Speed Feet Per Minute @ Radius") at the inside edge, middle line, and outside edge of the spiral conveyor tray 680 was calculated in feet/minute using the Time for 180 Degrees. These three speeds were then averaged for each test ("Average Speed"). FIGS. 8A, 9A, 10A, 11A, and 12A show the Calculated Speed and Average Speed for each test. The results of the tests described above are also presented in graphical form in FIGS. 8B, 9B, 10B, 11B, and 12B. In these graphs, the Average Speed of the material is plotted against motor speed for each position of the connecting rod 630.

As illustrated in FIGS. 8A and 8B, the vertical spiral conveyor 600 is capable of conveying Cheerios® cereal upward around the spiral conveyor tray 680 at an average speed of greater than 30 feet per minute (fpm), greater than 35 fpm, greater than 40 fpm, greater than 45 fpm, greater than 50 fpm, greater than 55 fpm, between about 30 fpm and about 55 fpm, between about 40 fpm and about 55 fpm, and about 56 fpm.

Figure 12B:
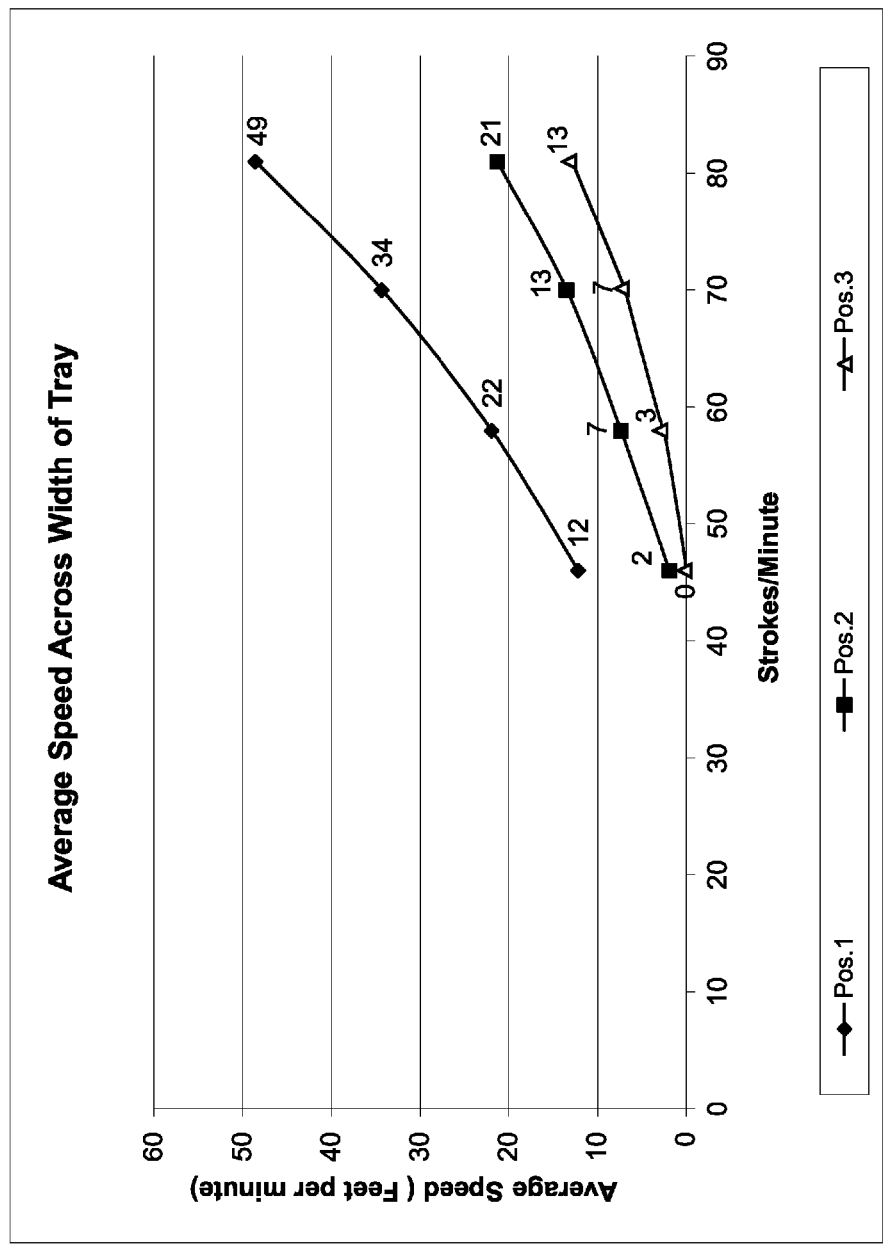

As illustrated in FIGS. 12A and 12B, the vertical spiral conveyor 600 is capable of conveying Kellogg's Corn Flakes® cereal upward around the spiral conveyor tray 680 at an average speed of greater than 30 fpm, greater than 35 fpm, greater than 40 fpm, greater than 45 fpm, between about 30 fpm and about 49 fpm, between about 40 fpm and about 49 fpm, and about 49 fpm.

The above examples show the spiral driven by the drive system to move material upward and around the spiral. In the alternative, the spiral can be driven by the drive system to move material downward and around the spiral. This would be done by changing the attachment point of the shuffle drive to the spiral to, in effect, flip the teardrop shaped curve so that material is moved downwards and around the spiral.

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

I claim:

1. A vertical spiral conveyor for transporting loose material without the use of vibration or oscillation, comprising:
   a frame:
   a vertical spiral fabrication comprising a spiral conveyor tray connected to a vertical member that is configured to rotate about an axis of rotation;
   a drive arm extending from the vertical spiral fabrication;
   at least one mechanical accumulator attached between the frame and at least one of the vertical spiral fabrication and the drive arm; and
   a drive system for rotating the vertical spiral fabrication about the axis of rotation, the drive system comprising a power source and a transmission coupled to the drive arm;
   wherein the drive system generates alternating forward and backward strokes on the drive arm that rotate the vertical spiral fabrication clockwise and counterclockwise about the axis of rotation to cause loose material to be conveyed around the spiral conveyor tray.

2. The vertical spiral conveyor of claim 1, wherein the vertical spiral fabrication accelerates at a first acceleration rate to a maximum forward speed and then suddenly decelerates at a first deceleration rate during each forward stroke to cause the loose material to slide forward on the spiral conveyor tray.

3. The vertical spiral conveyor of claim 1, wherein the vertical spiral fabrication accelerates at a second acceleration rate to a maximum return speed during a first portion of each backward stroke to cause the spiral conveyor tray to slide from under the loose material, and wherein the vertical spiral fabrication decelerates at a second deceleration rate during a second portion of each backward stroke to prohibit backward motion of the loose material on the spiral conveyor tray.

4. The vertical spiral conveyor of claim 1, wherein the maximum forward speed of the vertical spiral fabrication during the forward stroke and the maximum return speed of the vertical spiral fabrication during the backward stroke are between about 1400 fpm and about 1500 fpm.

5. The vertical spiral conveyor of claim 1, wherein the loose material is conveyed upward around the spiral conveyor tray to a top of the vertical spiral conveyor.

6. The vertical spiral conveyor of claim 1, wherein the vertical spiral fabrication rotates between about 2 degrees and about 10 degrees about the axis of rotation during each forward and backward stroke.

7. The vertical spiral conveyor of claim 1, wherein:
   a connecting rod couples the drive arm to the transmission;
   the drive arm extends horizontally from the vertical member;
   the connecting rod is coupled to the drive arm between about 15 inches and about 30 inches from the axis of rotation; and
   the spiral conveyor tray moves between about 2.5 inches and about 6 inches during each forward and backward stroke.

8. The vertical spiral conveyor of claim 1, wherein the outer diameter of the spiral conveyor tray is between about 50 and about 120 inches, the inner diameter of the spiral conveyor tray is between about 30 inches and about 72 inches, and the width of the spiral conveyor tray is between about 6 inches and about 36 inches.

9. The vertical spiral conveyor of claim 1, wherein the pitch of the spiral conveyor tray is between about 3 inches and about 12 inches.

10. The vertical spiral conveyor of claim 1, wherein the transmission is a differential motion transmission comprising a cam rotated by a drive shaft and a follower having a slot therein for receipt of the cam.

11. The vertical spiral conveyor of claim 1, wherein the transmission is a differential motion transmission comprising a drive shaft affixed to a driving member, a link, and a driven member, and wherein the link is rotatably mounted to the driving member and the driven member.

12. The vertical spiral conveyor claim 1, wherein:
   an output shaft of the transmission rotates from about 0 degrees to about 180 degrees during each forward stroke and from about 180 degrees to about 360 degrees during each backward stroke; and
   wherein the output shaft accelerates from a minimum rotation speed to a maximum rotation speed between about 0 degrees and about 120 degrees, decelerates from the maximum rotation speed to the minimum rotation speed between about 120 degrees and about 180 degrees, accelerates from the minimum rotation speed to the maximum rotation speed between about 180 degrees and about 240 degrees, and decelerates from the maximum rotation speed to the minimum rotation speed between about 240 degrees and about 360 degrees.

13. The vertical spiral conveyor of claim 12, wherein the minimum rotation speed of the output shaft is between about 30 RPM and about 60 RPM and the maximum rotation speed of the output shaft is between about 80 RPM and about 145 RPM.

14. The vertical spiral conveyor of claim 1, wherein the power source comprises a variable speed electric motor with a speed reducer.

15. The vertical spiral conveyor of claim 1, wherein:
   the vertical spiral fabrication accelerates at a first acceleration rate to a maximum forward speed and then suddenly decelerates at a first deceleration rate during each forward stroke to cause the loose material to slide forward on the spiral conveyor tray;

the vertical spiral fabrication accelerates at a second acceleration rate to a maximum return speed during a first portion of each backward stroke to cause the spiral conveyor tray to slide from under the loose material, and wherein the vertical spiral fabrication decelerates at a second deceleration rate during a second portion of each backward stroke to prohibit backward motion of the loose material on the spiral conveyor tray; and the first acceleration rate is less than the second acceleration rate and the first deceleration rate is greater than the second deceleration rate.

16. A vertical spiral conveyor for transporting loose material without the use of vibration or oscillation, comprising:

a frame;

a vertical spiral fabrication comprising a spiral conveyor tray connected to a vertical member that is configured to rotate about an axis of rotation;

a drive arm extending horizontally from the vertical member;

at least one mechanical accumulator attached between the frame and the vertical spiral fabrication and the drive arm, the mechanical accumulator comprising four accumulator portions, a first portion pivotally coupled to a second portion by a rocker arm, a third portion pivotally coupled to a fourth portion by a rocker arm, wherein the second and third portions are fixed relative to one another, wherein the first portion is coupled to the drive arm, and wherein the fourth portion is coupled to the frame; and a drive system for rotating the vertical spiral fabrication about the axis of rotation, the drive system comprising a power source, a transmission, and a connecting rod coupling the drive arm to an output shaft of the transmission;

wherein the drive system generates alternating forward and backward strokes on the drive arm that rotate the vertical spiral fabrication clockwise and counterclockwise about the axis of rotation to cause loose material to be conveyed upward around the spiral conveyor tray to a top of the vertical spiral conveyor;

wherein the vertical spiral fabrication accelerates at a first acceleration rate with a sudden deceleration at a first deceleration rate during each forward stroke to cause the loose material to slide forward on the spiral conveyor tray, accelerates at a second acceleration rate during a first portion of each backward stroke to cause the spiral conveyor tray to slide from under the loose material, and decelerates at a second deceleration rate during a second portion of each backward stroke to prohibit backward motion of the loose material on the spiral conveyor tray;

wherein the output shaft of the transmission rotates from about 0 degrees to about 180 degrees during each forward stroke and from about 180 degrees to about 360 degrees during each backward stroke;

wherein the output shaft accelerates at the first acceleration rate from a minimum rotation speed to a maximum rotation speed between about 0 degrees and about 120 degrees, decelerates at the first deceleration rate from the maximum rotation speed to the minimum rotation speed between about 120 degrees and about 180 degrees, accelerates at the second acceleration rate from the minimum rotation speed to the maximum rotation speed between about 180 degrees and about 240 degrees, and decelerates at the second deceleration rate from the maximum rotation speed to the minimum rotation speed between about 240 degrees and about 360 degrees;

wherein the first acceleration rate is less than the second acceleration rate and the first deceleration rate is greater than the second deceleration rate; and wherein one stroke of the drive arm includes one forward stroke and one backward stroke, and the drive system generates about 46 to about 81 strokes per minute resulting in an average movement speed of about 12 feet per minute to about 56 feet per minute of cereal pieces along the spiral conveyor tray.

17. The vertical spiral conveyor of claim 16, wherein the minimum rotation speed of the output shaft is between about 30 RPM and about 60 RPM and the maximum rotation speed of the output shaft is between about 80 RPM and about 145 RPM.

18. A method of transporting materials without the use of vibration or oscillation, comprising:

utilizing a vertical spiral conveyor, the vertical spiral conveyor comprising a frame, a vertical spiral fabrication having a spiral conveyor tray connected to a vertical member that is configured to rotate about an axis of rotation, a drive arm extending from the vertical spiral fabrication, at least one mechanical accumulator attached between the frame and at least one of the vertical spiral fabrication and the drive arm, and a drive system for rotating the vertical spiral fabrication about the axis of rotation, the drive system comprising a power source and a transmission coupled to the drive arm; and rotating the vertical spiral fabrication clockwise and counterclockwise about the axis of rotation to cause loose material to be conveyed around the spiral conveyor tray, wherein the drive system generates alternating forward and backward strokes on the drive arm that rotate the vertical spiral fabrication;

wherein one stroke of the drive arm includes one forward stroke and one backward stroke, and the drive system generates about 46 to about 81 strokes per minute resulting in an average movement speed of about 12 feet per minute to about 56 feet per minute of cereal pieces along the spiral conveyor tray.

19. The method of claim 18, wherein the vertical spiral fabrication accelerates at a first acceleration rate with a sudden deceleration at a first deceleration rate during each forward stroke to cause the loose material to slide forward on the spiral conveyor tray, accelerates at a second acceleration rate during a first portion of each backward stroke to cause the spiral conveyor tray to slide from under the loose material, and decelerates at a second deceleration rate during a second portion of each backward stroke to prohibit backward motion of the loose material on the spiral conveyor tray; and wherein the first acceleration rate is less than the second acceleration rate and the first deceleration rate is greater than the second deceleration rate.

20. The method of claim 19, wherein:

a connecting rod couples the drive arm to an output shaft of the transmission;

the output shaft rotates from about 0 degrees to about 180 degrees during each forward stroke and from about 180 degrees to about 360 degrees during each backward stroke; and the output shaft accelerates at the first acceleration rate from a minimum rotation speed to a maximum rotation speed between about 0 degrees and about 120 degrees, decelerates at the first deceleration rate from the maximum rotation speed to the minimum rotation speed between about 120 degrees and about 180 degrees, accelerates at the second acceleration rate from the minimum rotation speed to the maximum rotation speed between about 180 degrees and about 240 degrees, and decelerates at the second deceleration rate from the maximum rotation speed to the minimum rotation speed between about 240 degrees and about 360 degrees.

21. The method of claim 20, wherein the minimum rotation speed of the output shaft is between about 30 RPM and about 60 RPM and the maximum rotation speed of the output shaft is between about 80 RPM and about 145 RPM.

* * * * *